(12) United States Patent
Futatsugi et al.

(10) Patent No.: US 8,964,887 B2
(45) Date of Patent: Feb. 24, 2015

(54) WIRELESS TRANSMISSION DEVICE, WIRELESS TRANSMISSION METHOD, WIRELESS TRANSMISSION PROGRAM, AND WIRELESS COMMUNICATION SYSTEM

(75) Inventors: Yasunori Futatsugi, Tokyo (JP); Masayuki Ariyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 215 days.

(21) Appl. No.: 13/580,308

(22) PCT Filed: Jan. 7, 2011

(86) PCT No.: PCT/JP2011/000047
§ 371 (c)(1),
(2), (4) Date: Oct. 23, 2012

(87) PCT Pub. No.: WO2011/104998
PCT Pub. Date: Sep. 1, 2011

(65) Prior Publication Data
US 2013/0058432 A1     Mar. 7, 2013

(30) Foreign Application Priority Data
Feb. 23, 2010   (JP) .................................. 2010-037851

(51) Int. Cl.
  *H04B 15/00*       (2006.01)
  *H04J 11/00*       (2006.01)
(52) U.S. Cl.
  CPC ........... *H04J 11/0036* (2013.01); *H04J 11/003* (2013.01)
  USPC ........................................................ 375/296

(58) Field of Classification Search
  USPC ................................................. 375/296, 224
  See application file for complete search history.

(56) References Cited

U.S. PATENT DOCUMENTS

2006/0008017 A1    1/2006   Balakrishnan et al.
2008/0117959 A1*   5/2008   Subrahmanya et al. ...... 375/224

FOREIGN PATENT DOCUMENTS

| CN | 101933371 A | 12/2010 |
| JP | 2008-505567 A | 2/2008 |
| JP | 2009-89393 A | 4/2009 |
| JP | 2009272830 A | 11/2009 |

(Continued)

OTHER PUBLICATIONS

Yasunori Futatsugi et al., "A Study on Interference Suppression Technique by Partitioned Frequency- and Time-domain Processing for Dynamic Spectrum Access", IEICE Technical Report SR2010-9, May 2010, pp. 49-55, vol. 110, No. 41.

(Continued)

*Primary Examiner* — Jaison Joseph
(74) *Attorney, Agent, or Firm* — Sughrue Mion, PLLC

(57) ABSTRACT

A wireless transmission device is characterized by including: first interference suppression processing means 71 for generating an interference suppression transmission signal for partially suppressing leakage power of a signal to an interference avoidance band by frequency-domain processing for the signal in a partial frequency band of transmission signals; and second interference suppression processing means 72 for generating an interference suppression transmission signal for suppressing leakage power of a signal to the interference avoidance band by time-domain processing for the signal in a partial or entire frequency band of transmission signals.

17 Claims, 27 Drawing Sheets

(56) References Cited

FOREIGN PATENT DOCUMENTS

| JP | 2010-124416 A | 6/2010 |
|----|---------------|--------|
| JP | 20114002 A | 1/2011 |
| JP | 2011511558 A | 4/2011 |
| WO | 2009097070 A1 | 8/2009 |

OTHER PUBLICATIONS

Srikanth Pagadarai et al., "A Sub-optimal Sidelobe Suppression Technique for OFDM-based Cognitive Radios", Military Communications Conference, 2008, pp. 1-6.
Hiroshi Yamaguchi et al., "Active Interference Cancellation Technique for MB-OFDM Cognitive Radio", 34th European Microwave Conference, 2004, pp. 1105-1108.
Sinja Brandes et al., "Reduction of Out-of-Band Radiation in OFDM Based Overlay Systems", New Frontiers in Dyanmic Spectrum Access Networks, 2005, First IEEE International Symposium on, pp. 662-665.
Sinja Brandes et al., "Sidelobe Suppression in OFDM Systems by Insertion of Cancellation Carriers", VTC2005, 2005, pp. 152-156.
International Search Report for PCT/JP2011/000047 dated Feb. 1, 2011.
Mahmoud S. El-Saadany, et al., "Revisiting Active Cancellation Carriers for Shaping the Spectrum of OFDM-based Cognitive Radios", Sarnoff Symposium, 2009. SARNOFF '09 IEEE, Mar. 30, 2009, pp. 1-5.
Communication dated Sep. 2, 2014 from the Japanese Patent Office in counterpart Japanese Patent Application No. 2012501659.
Communication dated Oct. 28, 2014, issued by the State Intellectual Property Office of P.R. China in counterpart Chinese application No. 201180010474.9.

\* cited by examiner

FIG. 4

| ALLOCATION DETERMINATION INFORMATION =INTERFERENCE SUPPRESSION REQUESTING INFORMATION | | FREQUENCY GROUP ALLOCATION RESULT | |
|---|---|---|---|
| INTERFERENCE SUPPRESSION REQUESTING NEAR TRANSMISSION BAND IS STRONG | INTERFERENCE SUPPRESSION REQUESTING FAR FROM TRANSMISSION BAND IS WEAK | NUMBER OF SUBCARRIERS AS INTERFERENCE SOURCES, TO WHICH FREQUENCY-DOMAIN INTERFERENCE SUPPRESSION MEANS IS APPLIED, IS LARGE | NUMBER OF SUBCARRIERS AS INTERFERENCE SOURCES, TO WHICH TIME-DOMAIN INTERFERENCE SUPPRESSION MEANS IS APPLIED, IS SMALL |
| INTERFERENCE SUPPRESSION REQUESTING NEAR TRANSMISSION BAND IS WEAK | INTERFERENCE SUPPRESSION REQUESTING FAR FROM TRANSMISSION BAND IS STRONG | NUMBER OF SUBCARRIERS AS INTERFERENCE SOURCES, TO WHICH FREQUENCY-DOMAIN INTERFERENCE SUPPRESSION MEANS IS APPLIED, IS SMALL | NUMBER OF SUBCARRIERS AS INTERFERENCE SOURCES, TO WHICH TIME-DOMAIN INTERFERENCE SUPPRESSION MEANS IS APPLIED, IS LARGE |

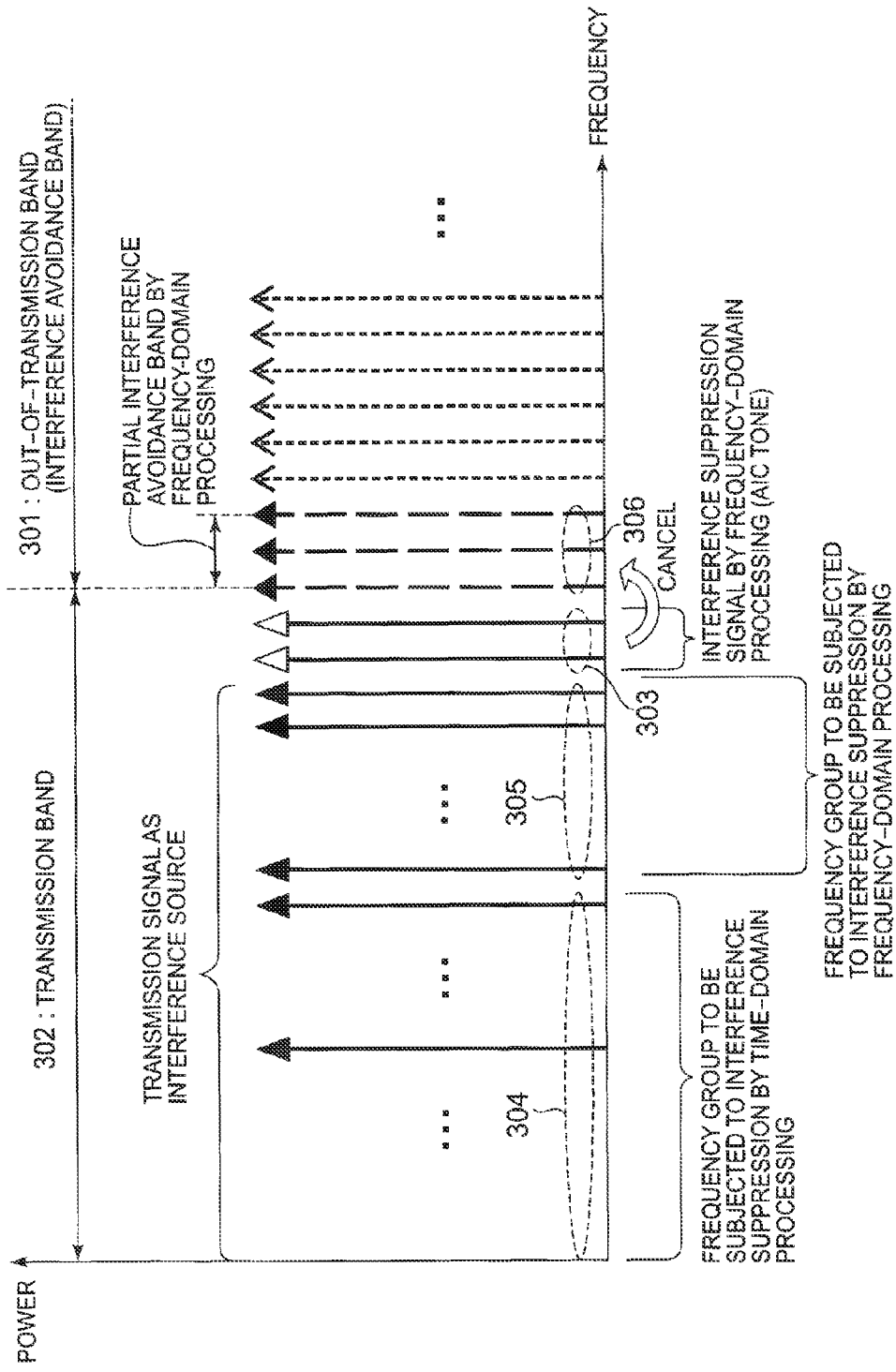

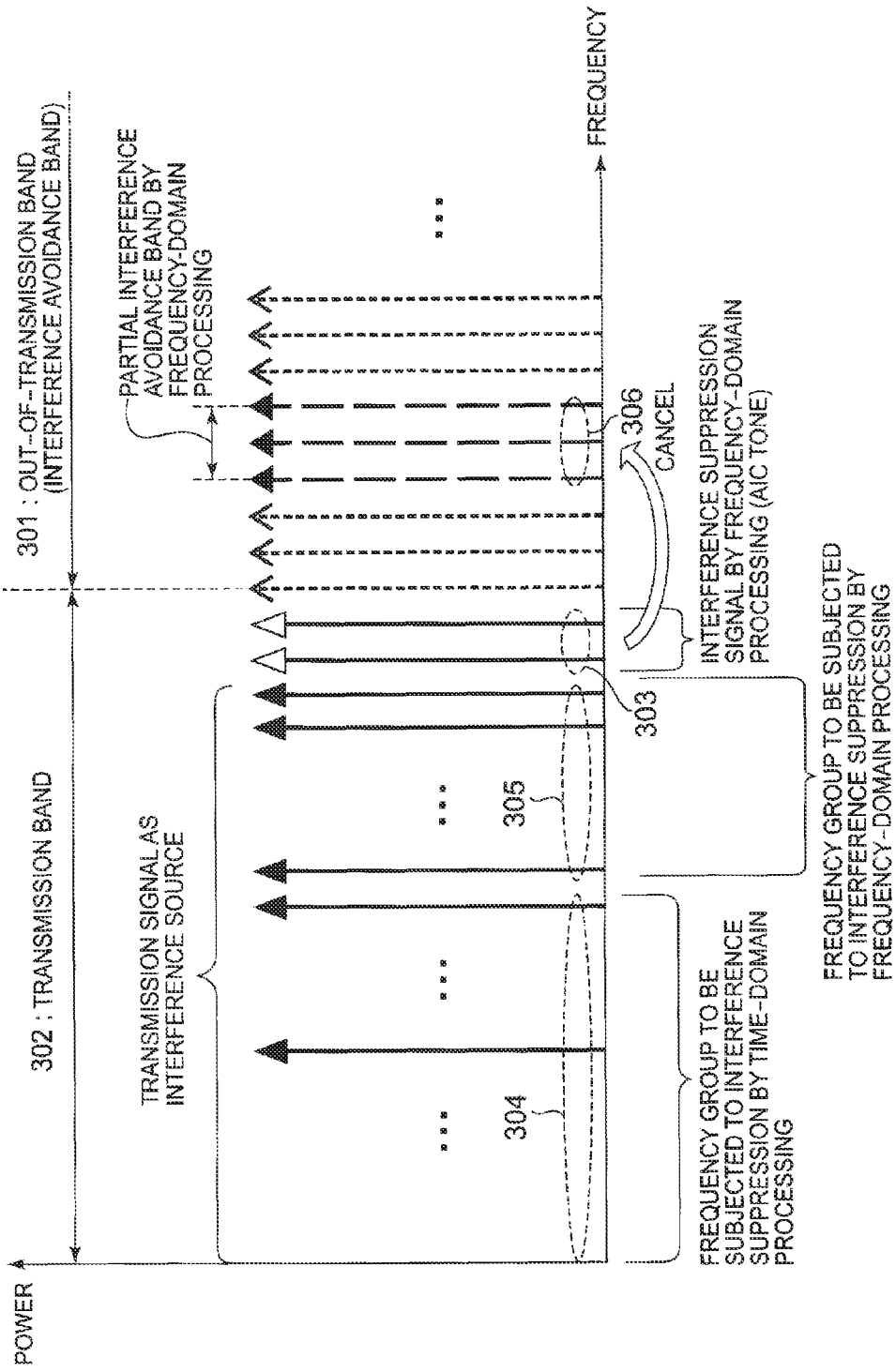

FIG. 19A

| INTERFERENCE SUPPRESSION REQUESTING INFORMATION (PARTIAL INTERFERENCE AVOIDANCE BAND) | NUMBER OF SUBCARRIERS TO BE SUBJECTED TO INTERFERENCE SUPPRESSION BY AIC: Q |
|---|---|
| 1 (WEAK) | 3 |
| 2 | 4 |
| 3 | 5 |
| 4 | 6 |
| 5 (STRONG) | 7 |

FIG. 19B

| INTERFERENCE SUPPRESSION REQUESTING INFORMATION (BAND EXCLUDING PARTIAL INTERFERENCE AVOIDANCE BAND) | NUMBER OF SUBCARRIERS TO BE SUBJECTED TO INTERFERENCE SUPPRESSION BY AIC: Q |
|---|---|
| 5 (STRONG) | 3 |
| 4 | 4 |
| 3 | 5 |
| 2 | 6 |
| 1 (WEAK) | 7 |

FIG. 20A

| INTERFERENCE SUPPRESSION REQUESTING INFORMATION (PARTIAL INTERFERENCE AVOIDANCE BAND) | NUMBER OF AIC TONES |
|---|---|
| 1 (WEAK) | 1 |
| 2 | 2 |
| 3 | 3 |
| 4 | 4 |
| 5 (STRONG) | 5 |

FIG. 20B

| INTERFERENCE SUPPRESSION REQUESTING INFORMATION (BAND EXCLUDING PARTIAL INTERFERENCE AVOIDANCE BAND) | NUMBER OF AIC TONES |
|---|---|
| 5 (STRONG) | 1 |
| 4 | 2 |
| 3 | 3 |
| 2 | 4 |
| 1 (WEAK) | 5 |

FIG. 21A

| INTERFERENCE SUPPRESSION REQUESTING INFORMATION (PARTIAL INTERFERENCE AVOIDANCE BAND) | PARTIAL INTERFERENCE AVOIDANCE BANDWIDTH BY AIC |
|---|---|
| 1 (WEAK) | 5 |
| 2 | 4 |
| 3 | 3 |
| 4 | 2 |
| 5 (STRONG) | 1 |

FIG. 21B

| INTERFERENCE SUPPRESSION REQUESTING INFORMATION (PARTIAL INTERFERENCE AVOIDANCE BAND) | PARTIAL INTERFERENCE AVOIDANCE BANDWIDTH BY AIC |
|---|---|
| 1 (WEAK) | 1 |
| 2 | 2 |
| 3 | 3 |
| 4 | 4 |
| 5 (STRONG) | 5 |

FIG. 21C

| NUMBER OF AIC TONES | PARTIAL INTERFERENCE AVOIDANCE BANDWIDTH BY AIC |
|---|---|
| 1 | 1 |
| 2 | 2 |
| 3 | 3 |
| 4 | 4 |
| 5 | 5 |

BEFORE APPLICATION OF INTERFERENCE SUPPRESSION TECHNIQUE

AFTER APPLICATION OF INTERFERENCE SUPPRESSION TECHNIQUE

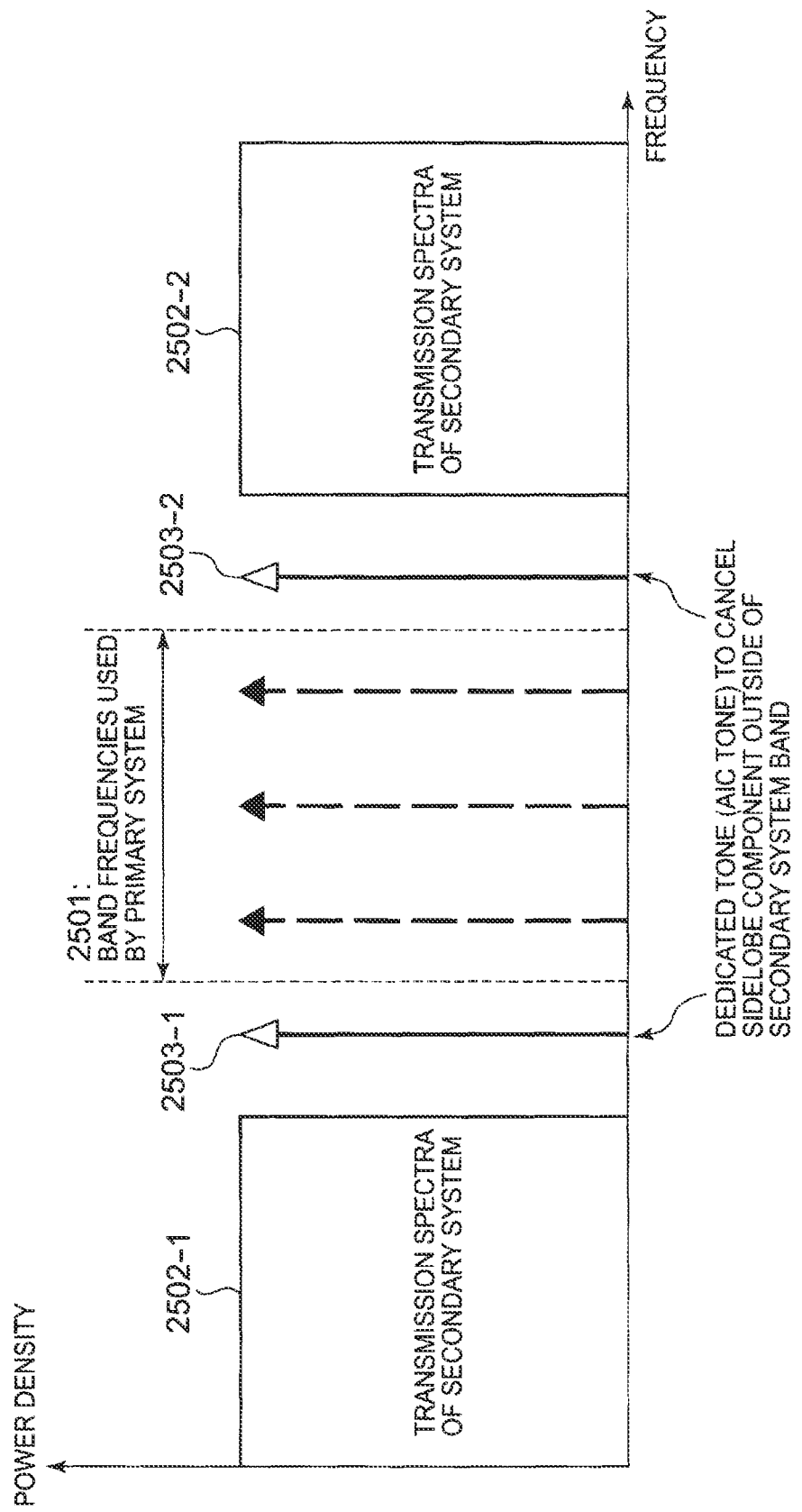

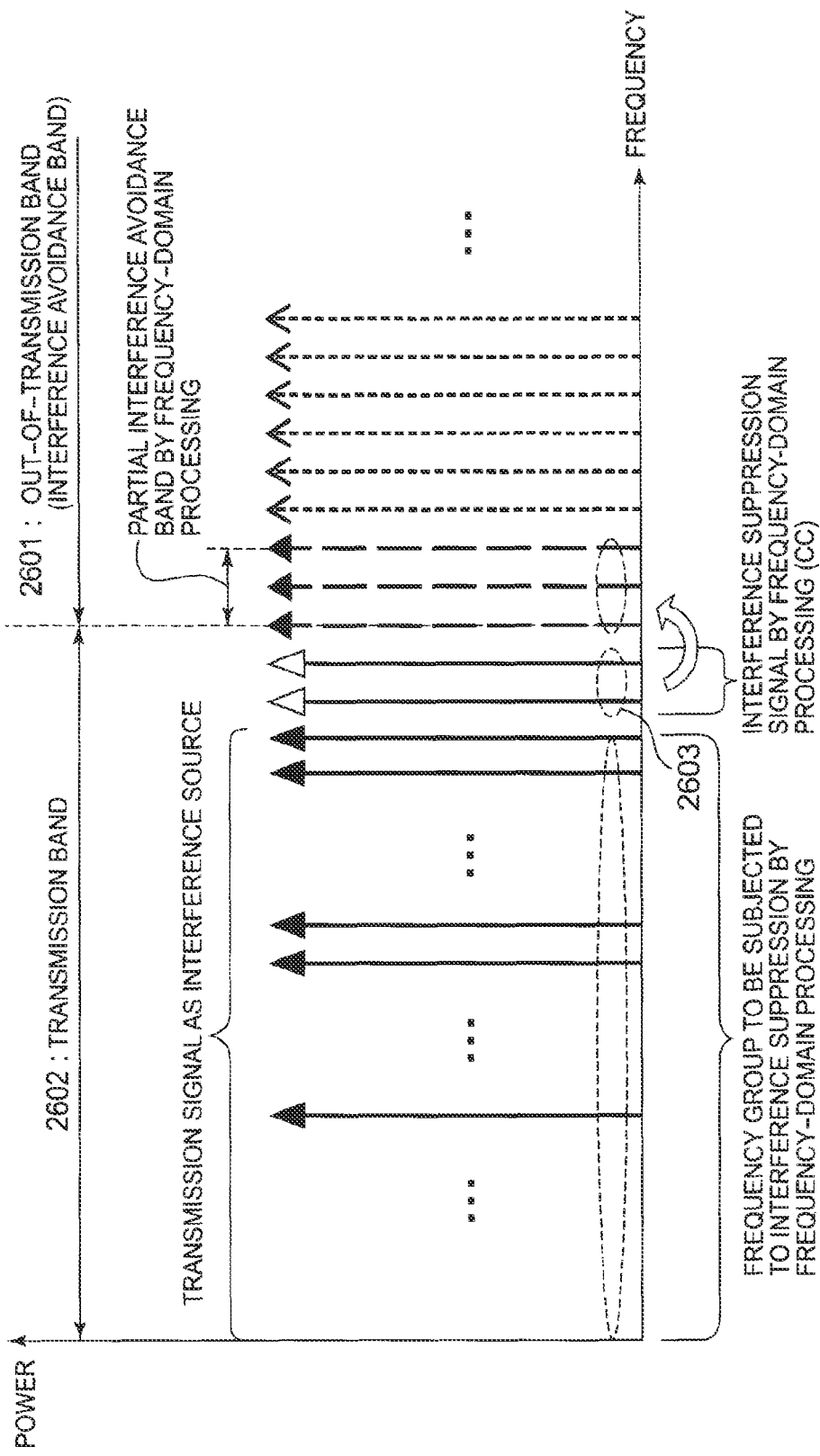

WIRELESS TRANSMISSION DEVICE, WIRELESS TRANSMISSION METHOD, WIRELESS TRANSMISSION PROGRAM, AND WIRELESS COMMUNICATION SYSTEM

CROSS REFERENCE TO RELATED APPLICATIONS

This application is a National Stage of International Application No. PCT/JP2011/000047 filed Jan. 7, 2011, claiming priority based on Japanese Patent Application No. 2010-037851 filed Feb. 23, 2010, the contents of all of which are incorporated herein by reference in their entirety.

TECHNICAL FIELD

The present invention relates to a wireless transmission device, a wireless transmission method, a wireless transmission program, and a wireless communication system.

BACKGROUND ART

In next-generation wireless communication systems, there are growing concerns about the exhaustion of frequency resources with the demand for wider bandwidths of transmission rates and the growing diversity of systems. Recently, cognitive radio for recognizing a surrounding radiowave environment and the needs of users to perform optimum communication autonomously has been considered. In this cognitive radio, dynamic spectrum access for allowing a frequency band allocated to an existing radio system to be secondarily used by another radio system has received attention from the standpoint of effective use of frequency resources. Specifically, dynamic spectrum access is to allow a secondary system as a new radio system to use a vacant spectrum in the frequency band allocated to a primary system as the existing radio system in such a manner not to interrupt communication of the primary system.

FIG. 27 is an explanatory drawing showing an example of a communication system for dynamic spectrum access. In the example shown in FIG. 27, a secondary system 2220 uses a vacant spectrum in a frequency band allocated to a primary system 2210 in such a manner not to interrupt communication of the primary system. In other words, the uplink or downlink of the secondary system 2220 shares the frequency band allocated to the uplink or downlink of the primary system 2210.

In the communication system shown in FIG. 27, the primary system 2210 includes a primary system base station 2211, a primary system mobile station 2212, and a primary system mobile station 2213. The primary system base station 2211 allows the exchange of data between the primary system mobile station 2212 and the primary system mobile station 2213.

Further, the secondary system 2220 includes a secondary system base station 2221, a secondary system mobile station 2222, and a secondary system mobile station 2223. The secondary system base station 2221 allows the exchange of data between the secondary system mobile station 2222 and the secondary system mobile station 2223.

As an example of dynamic spectrum access other than the example shown in FIG. 27, there can be IEEE802.22 WRAN (Wireless Regional Area Network). IEEE802.22 is a standard in the United States for systems in which, in a frequency band for land-based television broadcasting or a wireless microphone as an existing primary system, a fixed wireless access system as a secondary system uses a free channel of the frequency band of the primary system.

Next, an interference suppression technique related to dynamic spectrum access will be described. FIG. 28 is an explanatory drawing showing examples of band frequencies used by the primary system and spectra of the secondary system. FIG. 28(a) is a schematic diagram showing the band frequencies of the primary system and images of the spectra of the secondary system before the application of the interference suppression technique. FIG. 28(b) is a schematic diagram showing the band frequencies of the primary system and images of the spectra of the secondary system after the application of the interference suppression technique. In FIG. 28, the abscissa represents frequency and the ordinate represents power density.

In principle, the secondary system needs to perform communication not to interrupt the communication of the primary system. Therefore, in the example shown in FIG. 28, the secondary system spectra 2302-1 and 2302-2 need to be transmitted by suppressing interference with the band frequencies 2301-1, 2301-2, and 2301-3 used by the primary system. However, as shown in FIG. 28(a), in the actual transmission spectra, there is leakage power leaking into the outside of the transmission band. Therefore, there is fear that part of the spectra of the secondary system will interfere with the primary system because of this leakage power. Here, if sufficient guard bands (vacant frequency bands for guard) are provided for the band frequencies used by the primary system, interference with the primary system can be suppressed. However, when the sufficient guard bands are provided, there is fear of a decrease in frequency use efficiency.

As mentioned above, in a communication system using a cognitive radio technique for sharing the same frequency band between two or more systems, it is important for a secondary system to provide transmission while suppressing interference with the primary system without reducing the frequency use efficiency. When the secondary system is a system using an OFDM (Orthogonal Frequency Division Multiplexing) based wireless access method, since leakage power into the outside of the band becomes large due to sidelobe components of a subcarrier, interference suppression measures are particularly important.

For example, interference suppression transmission methods for suppressing interference with the primary system can include a digital filter system, a null regeneration method, a Gaussian multicarrier system, subcarrier weighting, time windowing, and AIC (Active Interference Cancellation). The digital filter system is a method of shaping a spectrum by using an FIR (Finite Impulse Response) filter or an IIR (Infinite Impluse Response) filter. The null regeneration method is a method of performing an FFT (Fast Fourier Transform) after multiple OFDM symbols are combined and performing an IFFT (Inverse Fast Fourier Transform) after null subcarrier replacement. The Gaussian multicarrier system is a multicarrier transmission system for shaping a spectrum with a Gaussian pulse waveform. Subcarrier weighting is a method of suppressing interference by weighting between symbols to be converted to subcarrier signals. Time windowing is a method of shaping an OFDM symbol in a time domain. AIC is a method of generating a tone for canceling an out-of-band leakage component to suppress interference. Among them, the AIC method having a high affinity for commercially existing radio systems and capable of dynamically suppressing interference to fit the surrounding radiowave conditions will be described below.

FIG. 29 is an explanatory drawing showing an example of the AIC method described in Non Patent Literature (NPL) 1.

FIG. 29 shows a state in which a secondary system transmits spectra 2502-1 and 2502-2 on both sides of band frequencies used by the primary system 2501, plotting frequency on the abscissa and power density on the ordinate. AIC is a method for providing dedicated tones (AIC tones) for canceling components of the secondary system spectra leaking into the band frequencies used by the primary system to suppress out-of-band power of the secondary system. In the example shown in FIG. 29, a total of two AIC tones 2503-1 and 2503-2 are provided, one for each side, outside of the band frequencies used by the primary system 2501 to suppress the out-of-band power of the secondary system. The use of AIC can lead to considerable suppression of the out-of-band power.

FIG. 30 is an explanatory drawing showing an example of a CC (Cancellation Carrier) method described in NPL 2 as a modification of AIC. FIG. 30 shows the relationships between a transmission band 2602 and frequency positions (interference avoidance band) 2601 outside the transmission band, plotting frequency on the abscissa and power density on the ordinate. Like AIC, the CC method provides dedicated tones (CC) for canceling spectrum components leaking from the transmission band 2602 into the interference avoidance band 2601. Note here that the term CC is a kind of AIC tone described in NPL 1 to be generated for suppressing power in a partial frequency band of the interference avoidance band, i.e., in a partial interference avoidance band. In the example shown in FIG. 30, among frequencies in the transmission band 2602, two CCs 2603 are provided at frequencies located near the interference avoidance band 2601. The CCs 2603 are operative to minimize the leakage power of the partial interference avoidance band located near the transmission band 2602 and having a large amount of power particularly leaking therein among the frequencies in the interference avoidance band.

Patent Literature (PTL) 1 also describes an example of interference suppression processing by AIC.

CITATION LIST

Patent Literature

PTL 1: Japanese Patent Published Application No. 2009-89393

Non Patent Literatures

NPL 1: H. Yamaguchi, "Active Interference Cancellation technique for MB-OFDM cognitive radio," 34th EMC, 2004.
NPL 2: S. Brandes, I. Cosovic, and M. Schnell, "Sidelobe suppression in OFDM systems by Insertion of cancellation carriers," VTC2005, 2005.

SUMMARY OF INVENTION

Technical Problems

However, the interference suppression methods using AIC tones described in NPL 1 and PTL 1 have a problem that, if the bandwidth (suppression target bandwidth) for suppressing leakage power by the AIC tones is wide, a sufficient suppressing effect cannot be obtained. Particularly, when the number of AIC tones is limited in consideration of frequency usage efficiency, there arises a problem that degradation of interference suppression performance becomes pronounced.

On the other hand, the interference suppression method by CC described in NPL 2 can suppress leakage power more efficiently than that by AIC when the interference avoidance bandwidth is wide. However, in the interference suppression method by CC described in NPL 2, since a suppression band in the interference avoidance band is restricted near the transmission band to generate a suppression signal (CC), there is a problem that a sufficient suppressing effect cannot be obtained in a frequency position away from the transmission band.

Thus, according to the AIC method and the CC method, interference can be dynamically suppressed to fit the surrounding radiowave conditions, but in the methods described in NPL 1, PTL 1, and NPL 2, there is an issue that interference with the primary system is given due to the above-mentioned problems.

Therefore, it is an object of the present invention to provide a wireless transmission device, a wireless transmission method, a wireless transmission program, and a wireless communication system capable of improving interference suppression performance without degrading frequency usage efficiency.

Solution to Problem

The wireless transmission device according to the present invention is characterized by including: first interference suppression processing means for generating an interference suppression transmission signal for partially suppressing the leakage power of a signal to an interference avoidance band by frequency-domain processing for the signal in a partial frequency band of transmission signals; and second interference suppression processing means for generating an interference suppression transmission signal for suppressing the leakage power of a signal to the interference avoidance band by time-domain processing for the signal in a partial or entire frequency band of transmission signals.

The wireless transmission method according to the present invention is characterized by including: generating an interference suppression transmission signal for partially suppressing the leakage power of a signal to an interference avoidance band by frequency-domain processing for the signal in a partial frequency band of transmission signals; and generating an interference suppression transmission signal for suppressing the leakage power of a signal to the interference avoidance band by time-domain processing for the signal in a partial or entire frequency band of transmission signals.

The wireless transmission program according to the present invention is characterized by causing a computer to perform: first interference suppression processing for generating an interference suppression transmission signal for partially suppressing the leakage power of a signal to an interference avoidance band by frequency-domain processing for the signal in a partial frequency band of transmission signals; and second interference suppression processing for generating an interference suppression transmission signal for suppressing the leakage power of a signal to the interference avoidance band by time-domain processing for the signal in a partial or entire frequency band of transmission signals.

The wireless communication system according to the present invention is characterized by including: a wireless transmission device for transmitting a radio signal; and an amount-of-interface measurement device including a detection section for detecting the radio signal transmitted by the wireless transmission device, wherein the amount-of-interference measurement device includes: amount-of-interference measurement means for measuring or estimating the amount of interference of the radio signal transmitted by the wireless transmission device with an interference avoidance band; and control signal notification means for generating a control signal based on the amount of interference measured or estimated by the amount-of-interference measurement means and notifying the wireless transmission device of the control signal, the control signal including interference suppression requesting information indicative of levels of interference suppression required or predetermined control information as an interference suppression processing parameter for frequency-domain processing of part of transmission signals and time-domain processing of part or all of transmission signals performed by the wireless transmission device as interference suppression processing.

Advantageous Effect of Invention

According to the present invention, there can be provided a wireless transmission device, a wireless transmission method, a wireless transmission program, and a wireless communication system capable of improving interference suppression performance without degrading frequency usage efficiency.

BRIEF DESCRIPTION OF DRAWINGS

FIG. 4 is an explanatory drawing showing an example of frequency group allocation in an allocation of interference suppression transmission deciding section 102.

FIG. 5 is a schematic diagram showing an example of the arrangement of subcarriers of transmission signals in the wireless transmission device of the first exemplary embodiment.

FIG. 6 is a schematic diagram showing another example of the arrangement of subcarriers of transmission signals in the wireless transmission device of the first exemplary embodiment.

FIG. 19 is an explanatory drawing showing examples of changing an interference suppression processing parameter.

FIG. 20 is an explanatory drawing showing examples of changing another interference suppression processing parameter.

FIG. 21 is an explanatory drawing showing examples of changing still another interference suppression processing parameter.

FIG. 29 is an explanatory drawing showing an example of an AIC method described in NPL 1.

FIG. 30 is an explanatory drawing showing an example of a CC method described in NPL 2.

DESCRIPTION OF EMBODIMENTS

Exemplary embodiments of the present invention will be described below with reference to the accompanying drawings. In each of the exemplary embodiments to be described below, description will be made by using a system to which OFDM is adopted as an example of the wireless access system. Further, in each of the exemplary embodiments, a case is taken as an example in which the wireless transmission device of the present invention is implemented as a transmitting device in a secondary system in the case of dynamic spectrum access.

Exemplary Embodiment 1

Figure 1:
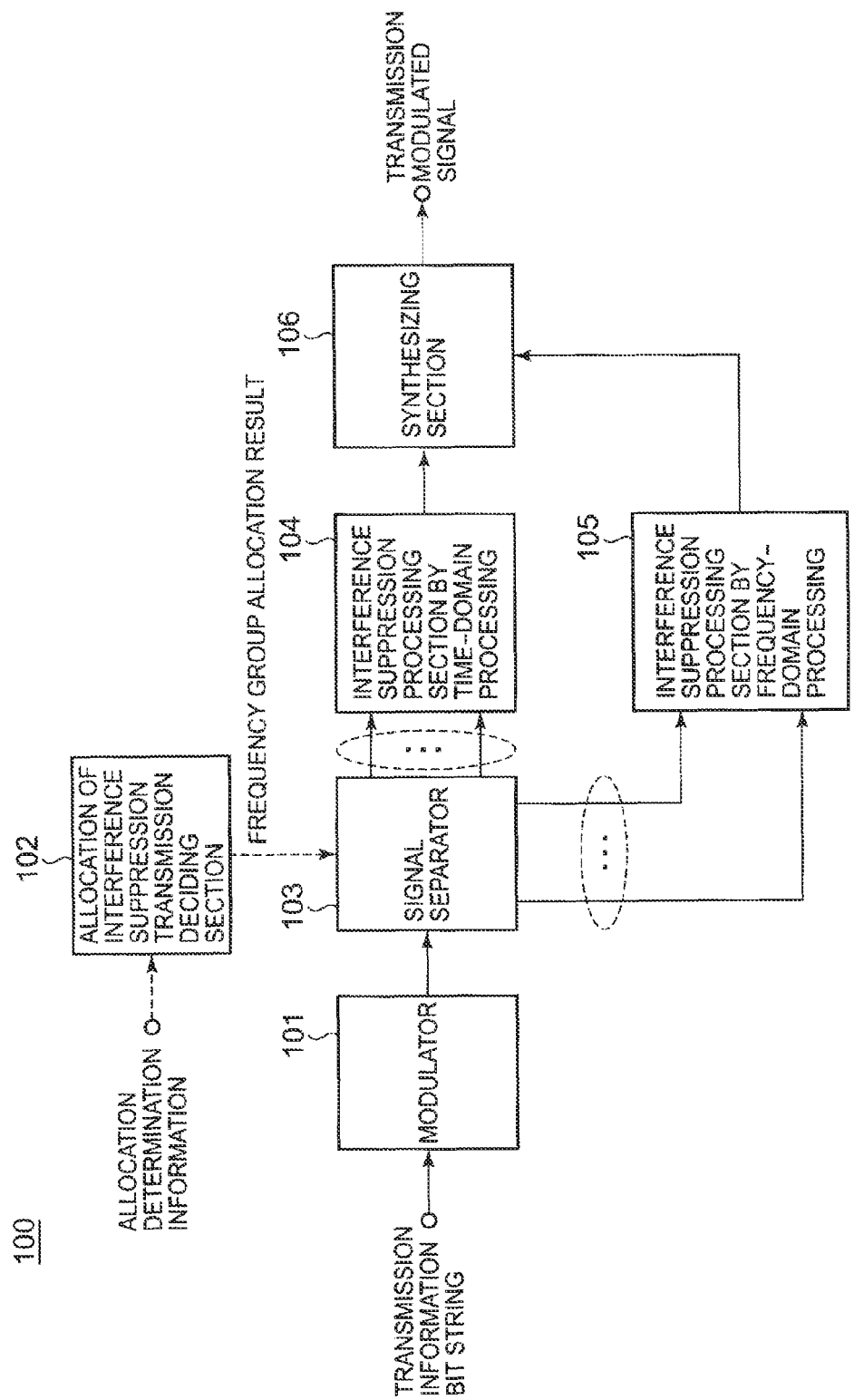
FIG. 1 is a block diagram showing an example of the structure of a base band unit provided in a wireless transmission device of a first exemplary embodiment.

FIG. 1 is a block diagram showing an example of the structure of a base band unit provided in a wireless transmission device of a first exemplary embodiment of the present invention. Here, the base band unit is a processing unit located upstream of an RF unit to process signals in a low-frequency region, which has, as input, a transmission information bit string, digitally generates and outputs a transmission modulated signal. In the exemplary embodiment, when generating a transmission modulated signal, interference suppression processing according to the present invention is performed in this base band unit.

A base band unit 100 shown in FIG. 1 includes a modulator 101, an allocation of interference suppression transmission deciding section 102, a signal separator 103, an interference suppression processing section 104 by time domain processing (hereinafter called a time-domain interference suppression processing section 104), an interference suppression processing section 105 by frequency domain processing (hereinafter called a frequency-domain interference suppression processing section 105), and a synthesizing section 106.

The modulator 101 performs modulation processing on input transmission information bit string. Specifically, each bit of the input transmission information bit string is mapped to a symbol as a unit of modulation. Further, the modulator 101 outputs a signal obtained by the modulation (hereinafter called a modulated signal) to the signal separator 103.

The allocation of interference suppression transmission deciding section 102 refers to predetermined allocation determination information to decide, for modulated signals, on the allocation of a frequency group on which the time-domain interference suppression processing section 104 performs interference suppression processing and the allocation of a frequency group on which the frequency-domain interference suppression processing section 105 performs interference suppression processing. Here, the allocation determination information is information as a criterion for deciding in which range of a transmission band allocated to the modulated signals interference is suppressed by the time-domain processing and in which range interference is suppressed by the frequency-domain processing. For example, the information may be interference suppression requesting information indicative of the levels of interference suppression required. It is desired that the frequency group to be allocated for interference suppression processing should be obtained by grouping frequency domains in the transmission band per radio resource (e.g., subcarrier) as the minimum unit. The allocation of interference suppression transmission deciding section 102 may decide in which frequency domain of the transmission band allocated to the modulated signals interference is suppressed by the frequency-domain processing and in which frequency domain interference is suppressed by the time-domain processing to allocate the frequency group to be subjected to the frequency-domain processing and the frequency group to be subjected to the time-domain processing. The allocation of interference suppression transmission deciding section 102 outputs, to the signal separator 103, information indicative of the allocation result of each frequency group as a frequency group allocation result.

In this example, the allocation of interference suppression transmission deciding section 102 allocates a frequency group to apply either an interference suppression transmission method by the frequency-domain processing or an interference suppression transmission method by the time-domain processing to a band of transmission signals to be interference sources per radio resource. Thus, interference is suppressed by the frequency-domain processing in at least a region of some transmission signals and interference is suppressed by the time-domain processing in the other regions.

Figure 2:
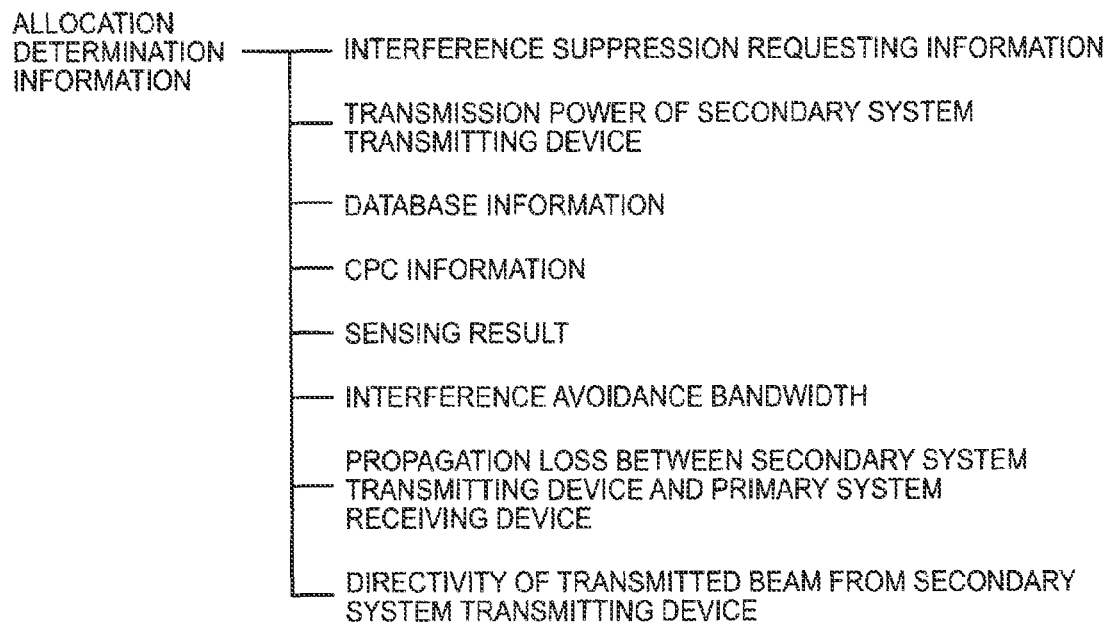
FIG. 2 is an explanatory drawing showing another example of allocation determination information.

FIG. 2 is an explanatory drawing showing another example of the allocation determination information. As shown in FIG. 2, for example, transmission power of a secondary system transmitting device (i.e., the wireless transmission device concerned), database information on the secondary system or a primary system, CPC information, sensing results, an interference avoidance bandwidth, frequency spacing from the interference avoidance band, transmission loss between a secondary system transmitting device and a primary system receiving device, the directivity of a transmitted beam from the secondary system transmitting device, and the like, may be used as well as the interference suppression requesting information. When these pieces of information are used, the amount of interference may be, for example, calculated or estimated from these pieces of information to determine a degree of interference to be suppressed in the interference avoidance band and to use the determined value as the interference suppression requesting information. The target for which the degree of interference to be suppressed is determined may be the entire interference avoidance band or only part of the interference avoidance band, or each of respective bands divided by a predetermined method, such as whether it is near or far, or per subcarrier.

The signal separator 103 inputs the modulated signal output from the modulator 101 and the frequency group allocation result supplied from the allocation of interference suppression transmission deciding section 102 to separate the modulated signal by the frequency group according to the frequency group allocation result. The signal separator 103 outputs the modulated signal separated by the frequency group to the time-domain interference suppression processing section 104 or the frequency-domain interference suppression processing section 105. To be more specific, a modulated signal in a frequency domain allocated as a frequency group to be subjected to the time-domain processing (hereinafter called a partial modulated signal belonging to the frequency group) is output to the time-domain interference suppression processing section 104, and a partial modulated signal belonging to the frequency group to be subjected to the frequency-domain processing is output to the frequency-domain interference suppression processing section 105. When the domain belonging to the other frequency group is included as an output data format, the portion is output by setting it to an invalid value (e.g., zero) indicative of no transmission data.

The time-domain interference suppression processing section 104 performs interference suppression by the time-domain processing on the modulated signal separated by the signal separator 103 (i.e., the modulated signal in the frequency domain to be subjected to the time-domain processing) to generate a signal after being subjected to the interference suppression processing. The time-domain interference suppression processing section 104 may also use, for example, time windowing as a method for interference suppression by the time-domain processing. The time-domain interference suppression processing section 104 outputs the signal after being subjected to the interference suppression processing to the synthesizing section 106.

The frequency-domain interference suppression processing section 105 performs interference suppression by the frequency-domain processing on the modulated signal separated by the signal separator 103 (i.e., the modulated signal in the frequency domain to be subjected to the frequency-domain processing) to generate a signal after being subjected to the interference suppression processing. The frequency-domain interference suppression processing section 105 may also use, for example, AIC as a method for interference suppression by the time-domain processing. When AIC is used, an AIC tone for suppressing interference in part of the interference avoidance band (e.g., a partial interference avoidance band near the transmission band) is generated and inserted into a transmission symbol. The frequency-domain interference suppression processing section 105 outputs the signal after being subjected to the interference suppression processing to the synthesizing section 106.

The synthesizing section 106 synthesizes the signal after being subjected to the interference suppression processing and output from the time-domain interference suppression processing section 104 with the signal after being subjected to the interference suppression processing and output from the frequency-domain interference suppression processing section 105. The synthesized signal is output as a transmission modulated signal.

Figure 3:
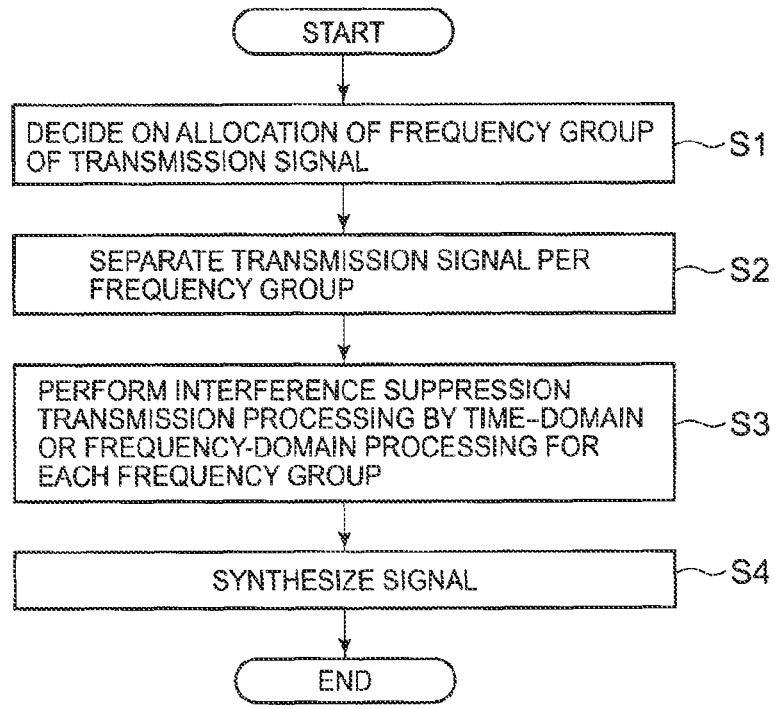
FIG. 3 is a flowchart showing an example of transmission operation of a base band unit 100.

FIG. 3 is a flowchart showing an example of transmission operation of the base band unit 100 in the exemplary embodiment. As shown in FIG. 3, based on the predetermined allocation determination information, the allocation of interference suppression transmission deciding section 102 decides, for an input modulated signal, on the allocation of a frequency group as to which frequency domain is to be targeted for interference suppression by the time-domain processing or interference suppression by the frequency-domain processing (step S1). A frequency group may be allocated each time a transmission information bit string is input, at the timing of acquiring the allocation determination information, or at the timing of changing the allocation determination information.

When a transmission information bit string is input and modulated by the modulator 101, the signal separator 103 separates the modulated signal output from the modulator 101 per group of frequency domains based on the frequency group allocation result supplied from the allocation of interference suppression transmission deciding section 102 (step S2). Each of the separated signals is input per frequency group to the time-domain interference suppression processing section 104 or the frequency-domain interference suppression processing section 105.

The time-domain interference suppression processing section 104 and the frequency-domain interference suppression processing section 105 input modulated signals in respective groups of frequency domains output from the signal separator 103, respectively, to perform interference suppression processing different in performance from each other (step S3). The signal after being subjected to the interference suppression processing by the time-domain interference suppression processing section 104 or the frequency-domain interference suppression processing section 105 is output to the synthesizing section 106, respectively.

The synthesizing section 106 inputs and synthesizes the modulated signals after being subjected to the interference suppression processing per group of frequency domains and output from the time-domain interference suppression processing section 104 and the frequency-domain interference suppression processing section 105 (step S4). The synthesizing section 106 outputs the synthesized signal as a transmission modulated signal.

FIG. 4 is an explanatory drawing showing an example of frequency group allocation in the allocation of interference suppression transmission deciding section 102. The example shown in FIG. 4 is an example of the result of the operation of the allocation of interference suppression transmission deciding section 102 when the allocation determination information is interference suppression requesting information. For example, as shown in FIG. 4, when an interference suppression request indicates that "interference suppression requesting near the transmission band is strong" and "interference suppression requesting far from the transmission band is weak," the allocation of interference suppression transmission deciding section 102 may decide, for transmission signals as interference sources, on the allocation of frequency groups in such a manner to increase the number of transmission subcarriers to which interference suppression by the frequency-domain processing is applied and to reduce the number of transmission subcarriers to which interference suppression by the time-domain processing is applied. Further, for example, when the interference suppression request indicates that "interference suppression requesting near the transmission band is weak" and "interference suppression requesting far from the transmission band is strong," the allocation of frequency groups may be decided in such a manner to reduce the number of transmission subcarriers to which interference suppression by the frequency-domain processing is applied and to increase the number of transmission subcarriers to which interference suppression by the time-domain processing is applied.

FIG. 5 is a schematic diagram showing an example of the arrangement of subcarriers of transmission signals in the wireless transmission device of the exemplary embodiment. In the example shown in FIG. 5, among transmission signals as interference sources in a transmission band 302 of the wireless transmission device, transmission subcarriers located away from an interference avoidance band 301 (i.e., a band outside of the transmission band) are decided to be a frequency group 304 in which interference is suppressed by the time-domain processing. On the other hand, transmission subcarriers located near the interference avoidance band 301 are decided to be a frequency group 305 in which interference is suppressed by the frequency-domain processing. Further, for the interference suppression by the frequency-domain processing, interference suppression signals (AIC tones) 303 are inserted in positions close to the interference avoidance band 301 inside the transmission band 302. In this example, the interference suppression signals 303 suppress a partial interference avoidance band 306 near the transmission band 302 inside the interference avoidance band 301.

FIG. 6 is a schematic diagram showing another example of the arrangement of subcarriers of transmission signals in the wireless transmission device of the exemplary embodiment. The above-mentioned example shown in FIG. 5 shows the example in which the partial interference avoidance band 306 is arranged close to the transmission band 302 for the interference suppression by the frequency-domain processing to generate the interference suppression signals 303. However, as shown in FIG. 6, the partial interference avoidance band 306 may not necessarily be close to the transmission band 302. For example, when interference with the primary system is great in frequency positions not near the transmission band 302, the partial interference avoidance band 306 may be arranged in a frequency band in which interference with the primary system is great to generate interference suppression signals 303.

As described above, according to the exemplary embodiment, interference suppression by the frequency-domain processing is limited to a part while performing interference suppression by the time-domain processing concurrently. Therefore, even if an interference avoidance band to suppress leakage power is wide, excellent interference suppression performance can be obtained without degrading frequency usage efficiency. Further, excellent interference suppression performance can be obtained in a position away from the transmission band inside the interference avoidance band. This is because, in interference suppression transmission methods, interference suppression transmission by the time-domain processing is superior for interference suppression in positions away from the transmission band, and interference suppression transmission by the frequency-domain processing is superior for interference suppression in positions near the transmission band. In addition, depending on the allocation determination information such as the interference suppression requesting information, the allocation of a frequency group to which an interference suppression transmission method by the frequency-domain processing is applied and a frequency group to which an interference suppression transmission method by the time-domain processing is applied can be changed to flexibly control the power density of leakage components in the interference avoidance band in order to satisfy a required spectrum mask more precisely.

Note that the exemplary embodiment shows the example in which the allocation of interference suppression transmission deciding section 102 allocates, for each radio resource, a frequency group to the band of transmission signals as interference sources so that either the interference suppression transmission method by the frequency-domain processing or the interference suppression transmission method by the time-domain processing will be applied, but the way of the combination use of the interference suppression transmission method by the frequency-domain processing and the interference suppression transmission method by the time-domain processing is not limited thereto. For example, the interference suppression transmission method by the frequency-domain processing and the interference suppression transmission method by the time-domain processing can be applied to part of the frequency domains at the same time. In this case, the interference suppression transmission method by the time-domain processing is applied to all transmission signals. On the other hand, the interference suppression transmission method by the frequency-domain processing is applied only to part of transmission signals.

Figure 7:
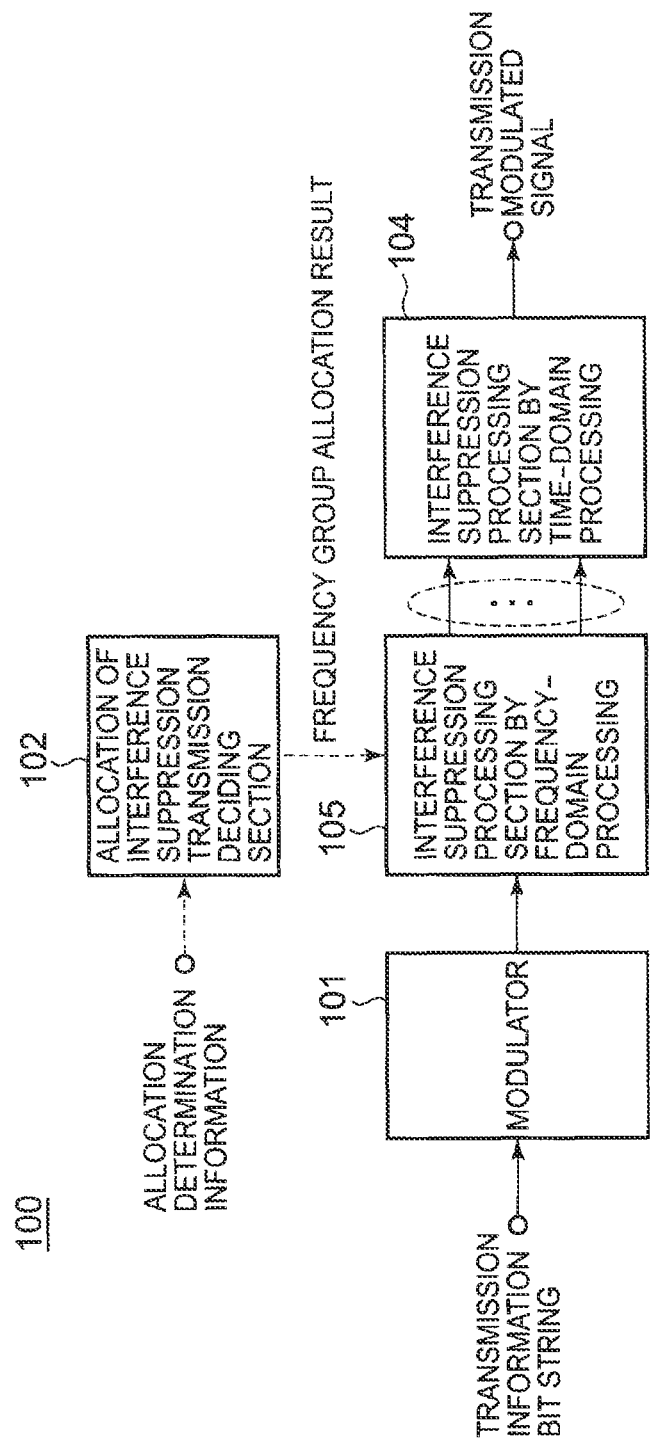
FIG. 7 is a block diagram showing another example of the structure of the base band unit in the first exemplary embodiment.

FIG. 7 is a block diagram showing a modification of the base band unit 100 shown in FIG. 1. The base band unit 100 shown in FIG. 7 includes the modulator 101, the allocation of interference suppression transmission deciding section 102, the interference suppression processing section 104 by the time-domain processing (time-domain interference suppression processing section 104), and the interference suppression processing section 105 by the frequency-domain processing (frequency-domain interference suppression processing section 105). Points different from the base band unit 100 shown in FIG. 1 are that the signal separator 103 and the synthesizing section 106 are omitted and the frequency-domain interference suppression processing section 105 is provided upstream of the time-domain interference suppression processing section 104. Note that the operation of each section is basically the same as that in FIG. 1.

In this example, a modulated signal modulated by the modulator 101 is output as is to the frequency-domain interference suppression processing section 105. Note that a signal after being subjected to processing by the frequency-domain interference suppression processing section 105 is output to the time-domain interference suppression processing section 104. The frequency group allocation result as information on the allocation result by the allocation of interference suppression transmission deciding section 102 is output to the frequency-domain interference suppression processing section 105.

Among input modulated signals, the frequency-domain interference suppression processing section 105 performs interference suppression by the frequency-domain processing on modulated signals in a frequency domain to be subjected to frequency-domain processing indicated by the frequency group allocation result supplied from the allocation of interference suppression transmission deciding section 103.

The time-domain interference suppression processing section 104 performs interference suppression by the time-domain processing on signals after being subjected to interference suppression by the frequency-domain processing and input from the frequency-domain interference suppression processing section 105. Note that a frequency group allocation result indicative of all domains of transmission signals as targets of interference suppression by the time-domain processing may also be input to the time-domain interference suppression processing section 104 so that the time-domain interference suppression processing section 104 will perform interference suppression by the time-domain processing on modulated signals in frequency domains to be subjected to processing (all the domains of transmission signals in this example) based on the input frequency group allocation result. Further, the time-domain interference suppression processing section 104 outputs, as transmission modulated signals, the signals after being subjected to interference processing by the time-domain interference suppression processing section 104.

Exemplary Embodiment 2

Figure 8:
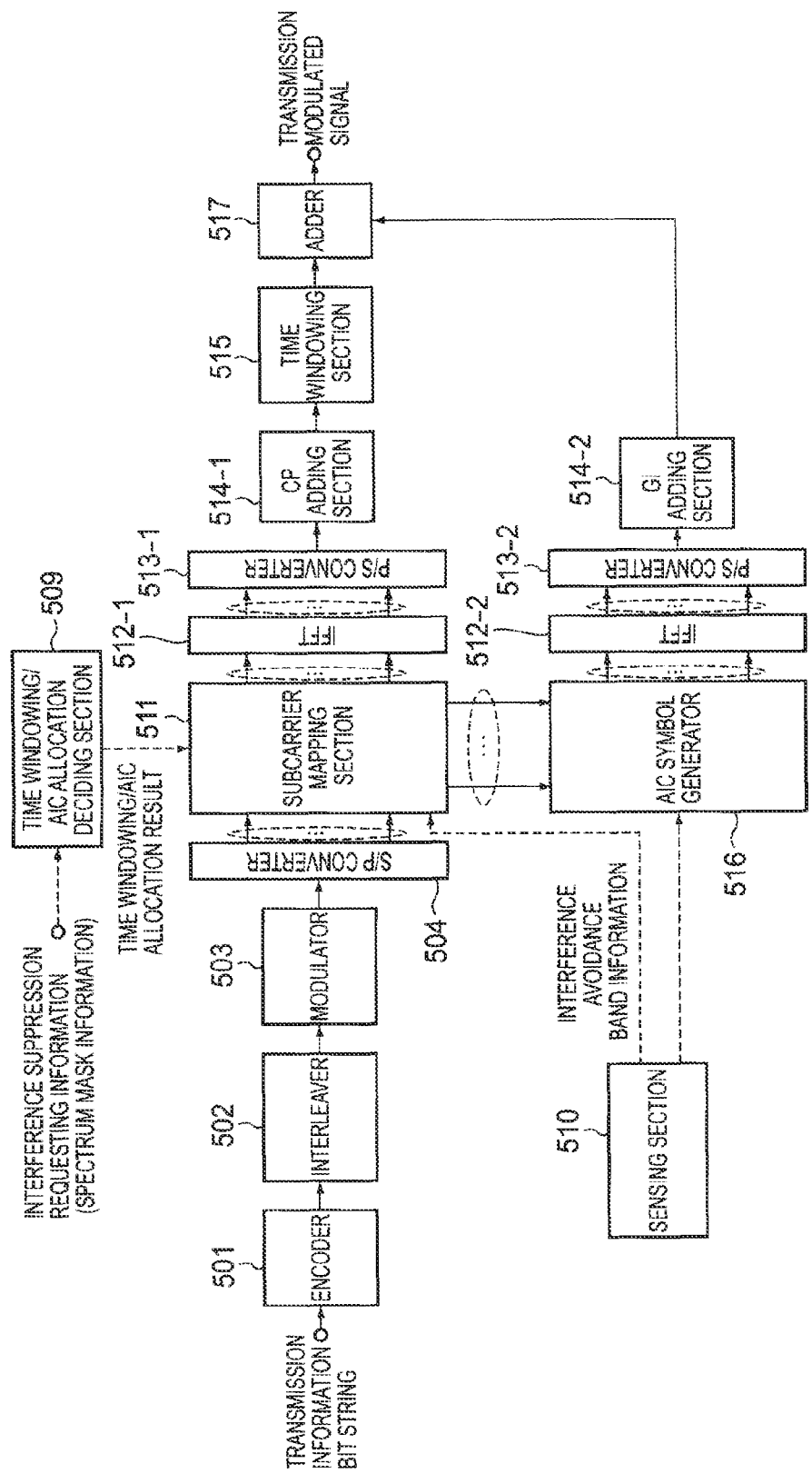
FIG. 8 is a block diagram showing an example of the structure of a base band unit in a second exemplary embodiment.

Next, a second exemplary embodiment of the present invention will be described with reference to the accompanying drawings. FIG. 8 is a block diagram showing an example of the structure of a base band unit in the second exemplary embodiment. The example shown in FIG. 8 is an example in which AIC is adopted in the structure shown in FIG. 1 as an interference suppression transmission method by the frequency-domain processing and time windowing is adopted as an interference suppression transmission method by the time-domain processing.

A base band unit 500 shown in FIG. 8 includes an encoder 501, an interleaver 502, a modulator 503, an S/P (serial/parallel) converter 504, a time windowing/AIC allocation deciding section 509, a sensing section 510, a subcarrier mapping section 511, IFFTs 512-1 and 512-2, P/S (parallel/serial) converters 513-1 and 513-2, a CP adding section 514-1, a GI adding section 514-2, a time windowing section 515, an AIC symbol generator 516, and an adder 517.

The encoder 501 inputs a transmission information bit string, performs encoding to correct errors in the input transmission information bit string, and outputs a coded bit string to the interleaver 502. Here, for example, convolutional coding or turbo coding is used for encoding.

The interleaver 502 inputs the bit string coded by the encoder 501, performs interleave processing for changing the array of bits on the input coded bit string, and outputs an interleaved bit string to the modulator 503.

The modulator 503 inputs the bit string interleaved by the interleaver 502, performs modulation processing for mapping the input bit string after being interleaved to a symbol, and outputs the modulated signal to the S/P converter 504. The modulator 503 maps (puts in order) the input bit string in a unit of modulation by a modulation method, such as QPSK (Quadrature Phase Shift Keying), 16QAM (Quadrature Amplitude Modulation), or 64QAM, to generate a modulated signal.

The S/P converter 504 inputs the modulated signal output from the modulator 503, performs serial/parallel conversion to convert the input modulated signal to a parallel signal in a unit of transmission frame, and outputs the modulated signal converted to the parallel signal in the unit of transmission frame to the subcarrier mapping section 511.

The time windowing/AIC allocation deciding section 509 inputs interference suppression requesting information corresponding to the allocation determination information in the first exemplary embodiment to decide on allocation per subcarrier based on the input interference suppression requesting information as to which to use as interference suppression means to be applied to the transmission signal, time windowing by the time-domain processing or AIC by the frequency-domain processing. Further, the time windowing/AIC allocation deciding section 509 outputs information indicative of the decided allocation result to the subcarrier mapping section 511 as the time windowing/AIC allocation result. The interference suppression requesting information may be, for example, information on a required spectrum mask.

The sensing section 510 senses a communication situation of the primary system to output, to the subcarrier mapping section 511 and the AIC symbol generator 516, information on a band used by the primary system, i.e., a band in which interference should be avoided (which may be called interference avoidance band information below).

The subcarrier mapping section 511 inputs the modulated signal converted to the parallel signal output from the S/P converter 504, the time windowing/AIC allocation result supplied from the time windowing/AIC allocation deciding section 509, and the interference avoidance band information supplied from the sensing section 510. Based on the time windowing/AIC allocation results, the subcarrier mapping section 511 separates the input modulated signals into a processing system for performing time windowing per subcarrier and a processing system for performing AIC processing per subcarrier. Further, based on the interference avoidance band information, the subcarrier mapping section 511 maps the subcarriers not to place any subcarrier in a band in which interference is to be avoided. The subcarrier mapping section 511 outputs, to the IFFT 512-1, modulated signals of a subcarrier on which time windowing is performed and, to the AIC symbol generator 516, modulated signals of a subcarrier on which AIC is performed.

The IFFT 512-1 inputs the modulated signals of the subcarrier output from the subcarrier mapping section 511 to be subjected to time windowing, performs IFFT processing (Inverse Fourier Transform processing) on the modulated signals to generate subcarrier signals, and outputs the generated subcarrier signals to the P/S converter 513-1.

The P/S converter 513-1 inputs the subcarrier signals output from the IFFT 512-1, performs parallel/serial conversion to convert the input subcarrier signals to serial signals, and outputs, to the CP adding section 514-1, modulated signals after converted to the serial signals. Note that the modulated signals output here can be modulated signals having data as an OFDM symbol group.

The CP adding section 514-1 inputs the modulated signals output from the P/S converter 513-1, performs processing for adding a CP (Cyclic Prefix) to the input modulated signals, and outputs, to the time windowing section 515, modulated signals with the CP is added thereto. For example, the CP adding section 514-1 performs processing for adding the CP by copying a rear portion of an OFDM symbol indicated by each of the input modulated signals to a position before the OFDM symbol.

The time windowing section 515 inputs the modulated signal with the CP added thereto and output from the CP adding section 514-1, and performs processing on the input modulated signal as time windowing processing for waveform-shaping both ends of the symbol in the time domain. Specifically, the time windowing section 515 first performs processing for adding a Tail on the OFDM symbol with the CP added thereto by copying, to a position behind the OFDM symbol indicated by the input modulated signal, a front portion of the OFDM symbol before the CP added thereto. Next, the time windowing section 515 performs processing for waveform-shaping an extended time-domain OFDM symbol and partially overlapping the OFDM symbols before and after being waveform-shaped. For waveform-shaping of an OFDM symbol, for example, a raised cosine roll-off waveform can be used for waveform shaping based on a predetermined Window overlapping length. Specifically, arithmetic processing for waveform shaping just has to be performed by using data on the modulated signal. The time windowing section 515 outputs, to the adder 517, a modulated signal after being subjected to the time windowing processing.

The AIC symbol generator 516 inputs the interference avoidance band information output from the sensing section 510 and the modulated signal of a subcarrier output from the subcarrier mapping section 511 and to be subjected to AIC processing, calculates a symbol (AIC symbol) for cancelling a leaked interference component in the interference avoidance band based on data on the input modulated signals and the interference avoidance band information, inserts it as part of a transmission symbol, and outputs, to the IFFT 512-2, a modulated signal with the AIC symbol inserted therein.

The IFFT 512-2 inputs the modulated signal in which the AIC symbol output from the AIC symbol generator 516 is inserted, and performs IFFT processing on the input modulated signal to generate a subcarrier signal. The IFFT 512-2 outputs, to the P/S converter 513-2, the subcarrier signal generated by the IFFT processing.

The P/S converter 513-2 inputs the subcarrier signal output from the IFFT 512-2, performs parallel/serial conversion for converting the input subcarrier signal to a serial signal, and outputs, to the GI adding section 514-2, a modulated signal after being converted to the serial signal. It can be said that the modulated signal output here is a modulated signal having data as an OFDM symbol group.

The GI adding section 514-2 inputs the modulated signal output from the P/S converter 513-2, performs processing for adding a GI (Guard Interval) to the input modulated signal, and outputs, to the adder 517, a modulated signal with the GI added thereto. The GI adding section 514-2 performs processing for adding, for example, zero-padded GI before the OFDM symbol. Note that any constant other than zero (e.g., 1 or 2) or a CP can also be added.

The adder 517 inputs the modulated signal output from the time windowing section 515 and the modulated signal output from the GI adding section 514-2, adds up both signals, and outputs the added signal as a transmission modulated signal.

Figure 9:
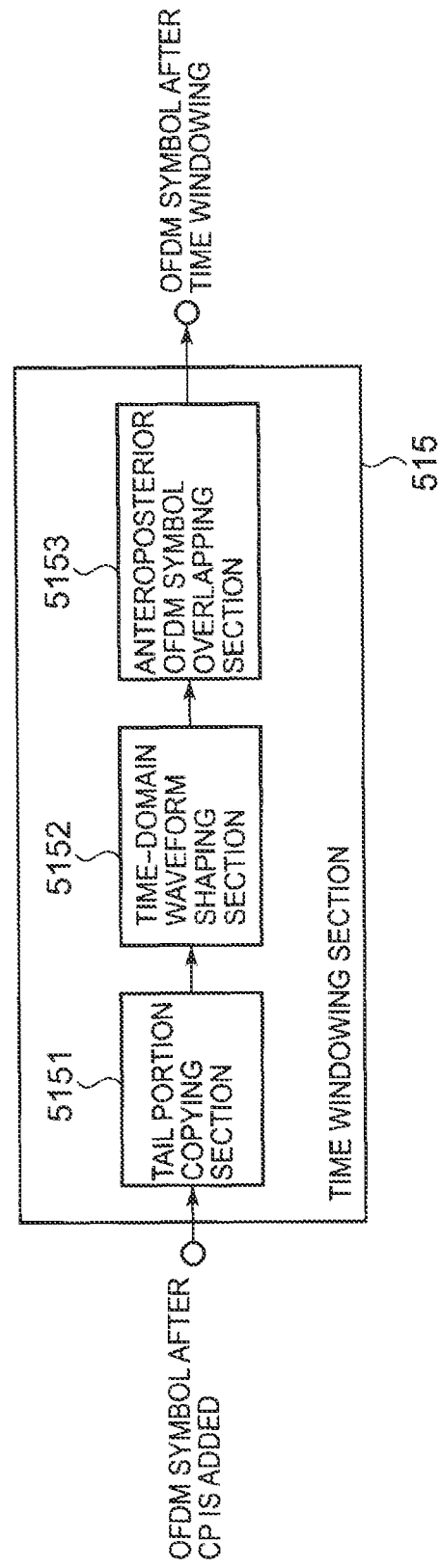
FIG. 9 is a block diagram showing a more detailed structure of a time windowing section 515.

FIG. 9 is a block diagram showing a more detailed structure of the time windowing section 515. As shown in FIG. 9, the time windowing section 515 may include a tail portion copying section 5151, a time-domain waveform shaping section 5152, and an anteroposterior OFDM symbol overlapping section 5153.

Figure 10:
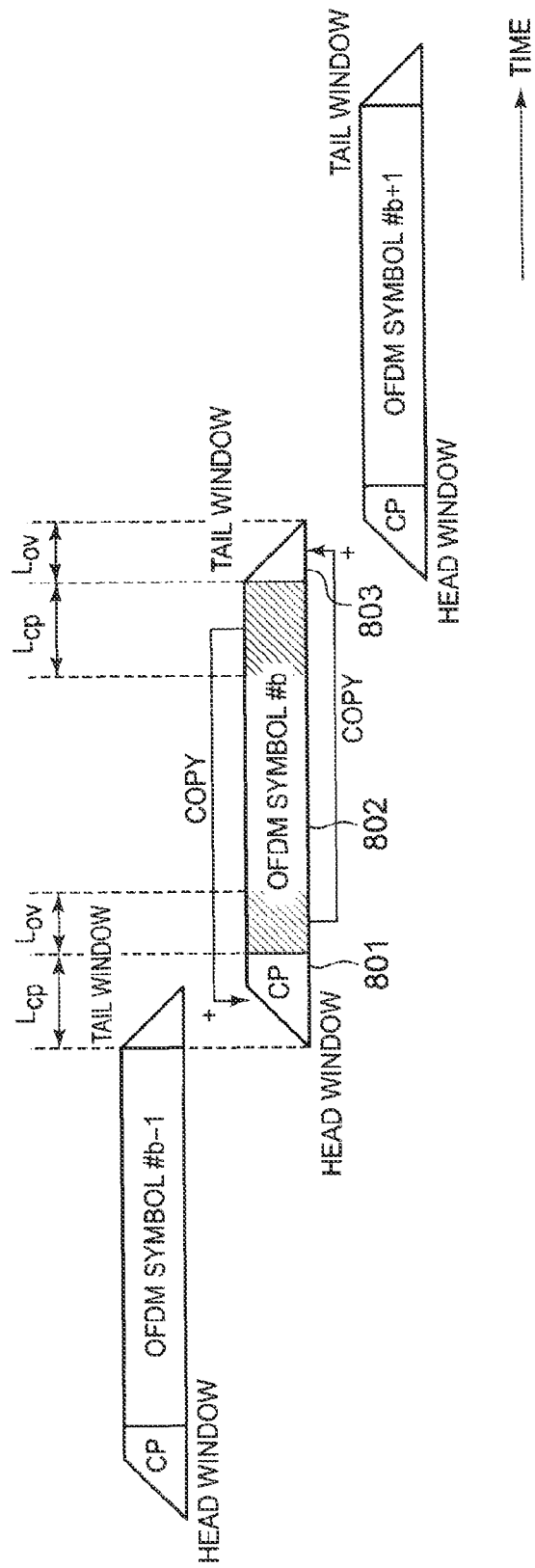
FIG. 10 is an explanatory drawing for describing the principle of time windowing processing.

FIG. 10 is an explanatory drawing for describing the principle of the time windowing processing. In FIG. 10, $L_{CP}$ denotes a CP length [sample] and $L_{OV}$ denotes a Window overlapping length [sample]. In the example shown in FIG. 10, the number of samples of CP 801 corresponds to $L_{CP}$, the number of samples of Tail 803 corresponds to $L_{OV}$, and an effective CP length is expressed by $L_{CP}$-$L_{OV}$. The time windowing section 515 performs waveform shaping on the input modulated signal (OFDM symbol after CP added thereto) as shown in FIG. 10 and time windowing processing for overlapping the anteroposterior OFDM symbols, and outputs, to the adder 517, the signal after being subjected to the processing. The following will describe the time windowing processing in more detail.

The tail portion copying section 5151 inputs the modulated signal output from the CP adding section 514-1 (i.e., the modulated signal having data as the OFDM symbol after the CP added thereto). The tail portion copying section 5151 sets, as Tail, a front portion of the OFDM symbol before the CP is added thereto, copies and adds it to a position behind the OFDM symbol according to the predetermined Window overlapping length $L_{OV}$ [sample]. The tail portion copying section 5151 outputs, to the time-domain waveform shaping section 5152, data on the OFDM symbol after Tail is added thereto.

The time-domain waveform shaping section 5152 inputs the data on the OFDM symbol after CP and Tail are added thereto from the tail portion copying section 5151. The time-domain waveform shaping section 5152 performs time-domain waveform shaping on the CP interval and Tail interval according to the Window overlapping length. As an example of waveform shaping, there can be waveform shaping based on a raised cosine roll-off waveform. Here, waveform shaping characteristics g(t) of sample t is expressed by Equation (1). In Equation (1), $N_{FFT}$ denotes a FFT size and a $L_{CP}$ denotes a CP length [sample].

[Math. 1]

$$g(t) = \begin{cases} \frac{1}{2} + \frac{1}{2}\cos\left(\pi + \frac{\pi}{L_{OV}}\right), & 0 \le t < L_{OV} \\ 1, & L_{OV} \le t < L_{CP} + N_{FFT} \\ \frac{1}{2} + \frac{1}{2}\cos\left(\frac{\pi(t - (L_{CP} + N_{FFT}))}{L_{OV}}\right), & L_{CP} + N_{FFT} \le t < L_{CP} + N_{FFT} + L_{OV} \end{cases} \quad \text{Eq. (1)}$$

The time-domain waveform shaping section 5152 outputs, to the anteroposterior OFDM symbol overlapping section 51531 data on the OFDM symbol after being subjected to waveform shaping.

The anteroposterior OFDM symbol overlapping section 5153 inputs the data on the OFDM symbol after being subjected to waveform shaping from the time-domain waveform shaping section 5152. The anteroposterior OFDM symbol overlapping section 5153 adds the CP interval (Head window) of its symbol after being subjected to waveform shaping and the Tail interval (Tail window) of the previous symbol after being subjected to waveform shaping according to the Window overlapping length $L_{OV}$ to overlap each other. Similarly, the Tail interval of its symbol after being subjected to waveform shaping and part of the CP interval of the symbol after being subjected to waveform shaping are overlapped with each other. The anteroposterior OFDM symbol overlapping section 5153 outputs, to the adder 517, a modulated signal (a modulated signal obtained by waveform shaping and overlapping the anterior and posterior OFDM symbols) generated by this processing.

Figure 11:
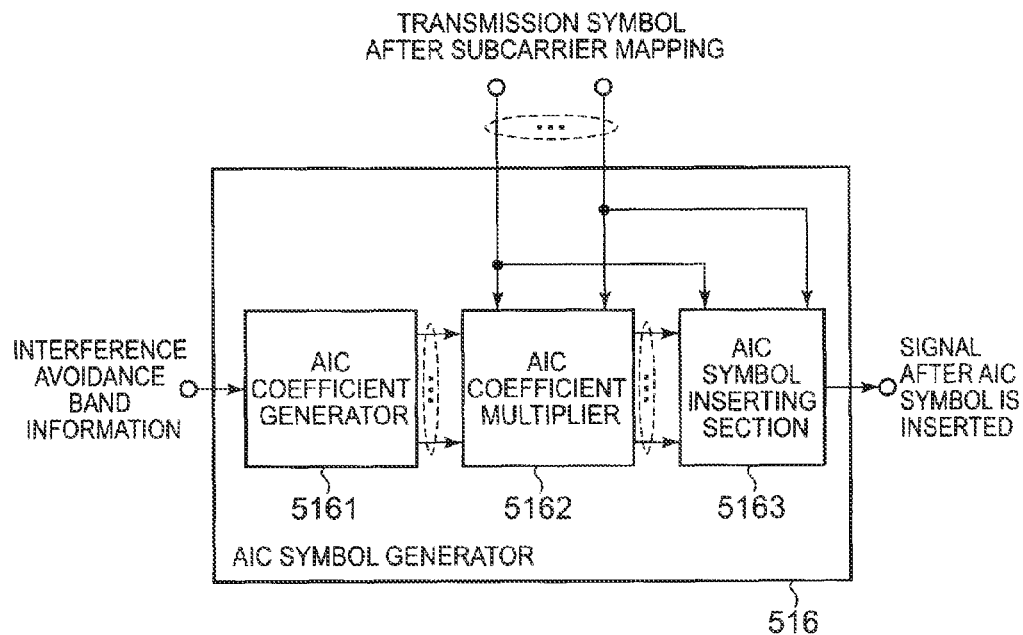
FIG. 11 is a block diagram showing an example of a more detailed structure of an AIC symbol generator 516.

FIG. 11 is a block diagram showing an example of a more detailed structure of the AIC symbol generator 516. As shown in FIG. 11, the AIC symbol generator 516 may include an AIC coefficient generator 5161, an AIC coefficient multiplier 5162, and an AIC symbol inserting section 5163.

The AIC coefficient generator 5161 inputs the interference avoidance band information from the sensing section 510, calculates an AIC coefficient, and outputs the calculated AIC coefficient to the AIC coefficient multiplier 5162. Here, the AIC coefficient, for example, corresponds to a matrix W in Equation (8) to be described later.

The AIC coefficient multiplier 5162 inputs the AIC coefficient output from the AIC coefficient generator 5161 and the modulated signal of the subcarrier output from the subcarrier mapping section 511 and to be subjected to AIC processing. The AIC coefficient multiplier 5162 multiplies the transmission symbol indicated by the input modulated signal and after being subjected to subcarrier mapping and the AIC coefficient together to generate an AIC symbol, and outputs data on the generated AIC symbol to the AIC symbol inserting section 5163. Here, the AIC symbol can be calculated, for example, by Equation (8) to be described later.

The AIC symbol inserting section 5163 inputs the modulated signal of the subcarrier output from the subcarrier mapping section 511 and to be subjected to AIC processing, and the data on the AIC symbol output from the AIC coefficient multiplier 5162, and inserts the AIC symbol into the transmission symbol. The AIC symbol inserting section 5163 outputs, to the IFFT 512-2, a modulated signal with the AIC symbol inserted therein (a modulated signal having data as a transmission symbol with the AIC symbol inserted therein).

Figure 12:
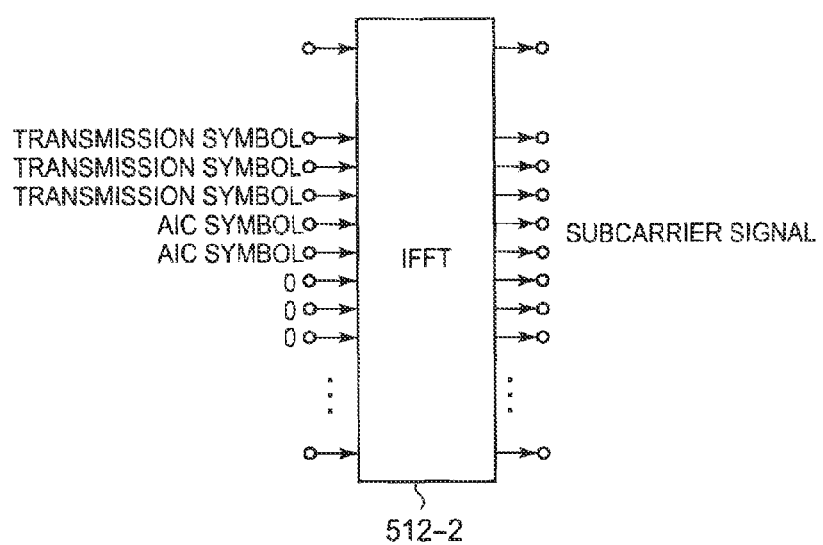
FIG. 12 is an explanatory drawing showing an example of input signals to an IFFT 512-2.

FIG. 12 is an explanatory drawing showing an example of input signals to the IFFT 512-2 (i.e., output signals from the AIC symbol inserting section 5163). FIG. 12 shows an example in which in addition to original transmission symbols, zero is inserted into symbols corresponding to the interference avoidance band, and AIC symbols are inserted between the transmission symbols and the symbols corresponding to the interference avoidance band.

Figure 13:
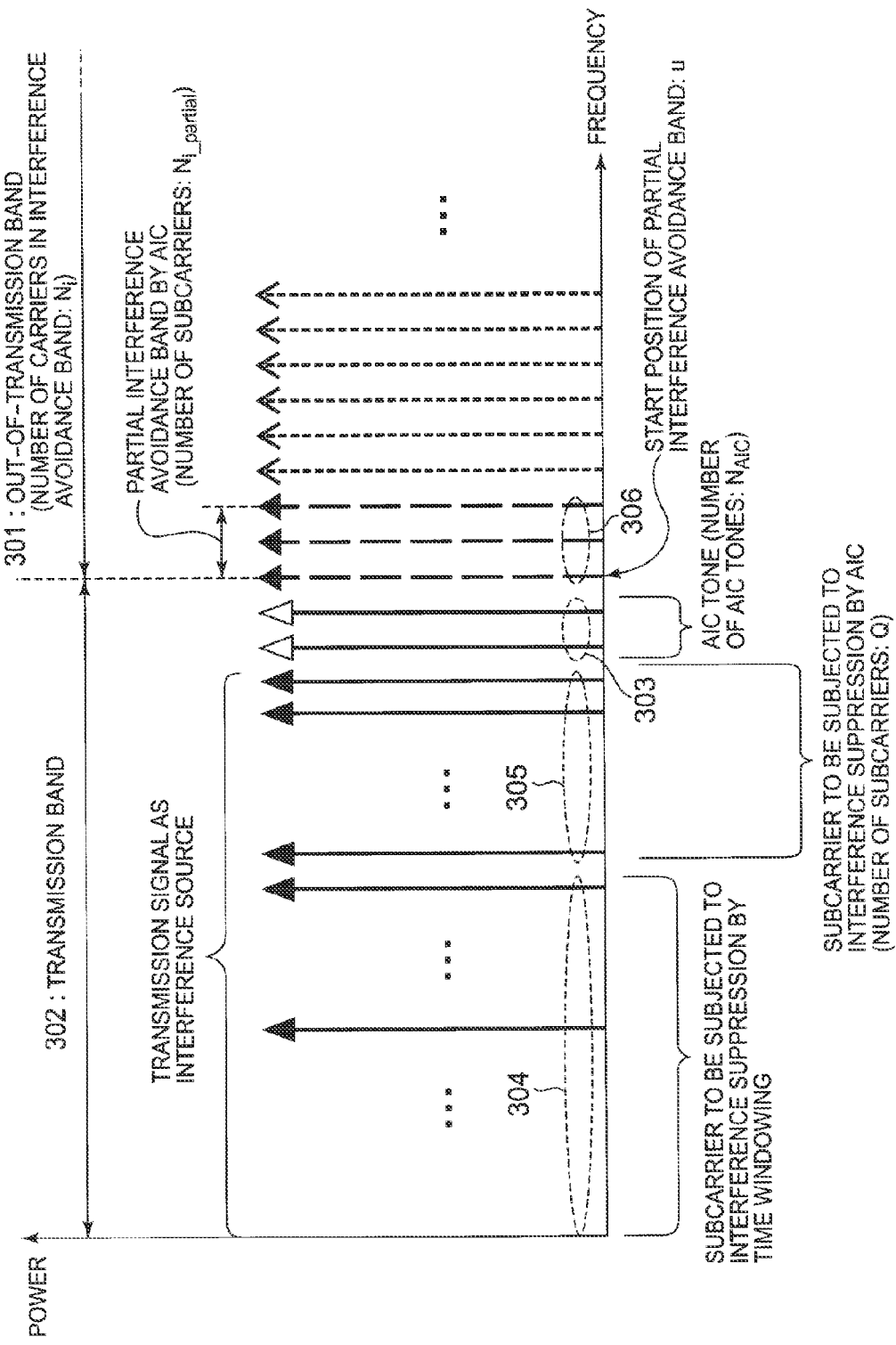
FIG. 13 is an explanatory drawing showing an example of generating AIC symbols by the AIC symbol generator 516.

Referring next to FIG. 13, an example of expressions for AIC symbol generation by the AIC symbol generator 516 will be described. FIG. 13 is an explanatory drawing showing an example of generating AIC symbols by the AIC symbol generator 516.

In the example shown in FIG. 13, it is assumed that transmission subcarriers 304 as interference sources located in the transmission band 302 away from the interference avoidance band 301 are suppressed by time windowing, and Q subcarriers 305 corresponding in number to transmission subcarriers as interference sources near the interference avoidance band 301 are subjected to interference suppression by AIC. In the example of interference suppression by AIC, it is assumed that AIC tones 303 corresponding in number to $N_{AIC}$ are inserted into the transmission band 302 adjacent to the interference avoidance band 301. Further, it is assumed that the AIC tones 303 performs suppression on a partial interference avoidance band 306 corresponding in number to $N_{i\_partial}$ near the transmission band 302 inside the interference avoidance band 301 corresponding to $N_i$ subcarriers.

An OFDM signal x(n) of a time-domain sample n (n=0, 1, . . . , N−1) as an output from the IFFT 512-1 is expressed by the following Equation (2), where X(k) with k (k=0, 1, . . . , N−1) in Equation (2) denotes a symbol to be transmitted and N denotes the FFT size of the IFFT:

[Math. 2]

$$x(n) = \sum_{k=0}^{N-1} X(k)\exp\left(j2\pi\frac{nk}{N}\right) \quad \text{Eq. (2)}$$

Further, a spectrum Y(l) of the OFDM signal in a frequency position l (l=0, 1, . . . , NM−1) upsampled to M times (M≥1) is expressed by the following Equation (3):

[Math. 3]

$$Y(l) = \frac{1}{N}\sum_{n=-\infty}^{N-1} x(n)\exp\left(-j2\pi\frac{n}{N}\frac{l}{M}\right) \quad \text{Eq. (3)}$$

From Equation (2) and Equation (3), the spectrum Y(l) of the OFDM signal is expressed by the following Equation (4), where P(l, k) in Equation (4) denotes a transform kernel:

[Math. 4]

$$Y(l) = \frac{1}{N}\sum_{n=0}^{N-1}\sum_{k=0}^{N-1} X(k)\exp\left(j2\pi\frac{n}{N}\left(k-\frac{l}{M}\right)\right) = \frac{1}{N}\sum_{k=0}^{N-1} X(k)P(l,k) \quad \text{Eq. (4)}$$

Here, if the number of subcarriers before upsampling of the interference avoidance band 301 is $N_i$ and the number of subcarriers before upsampling of the partial interference avoidance band 306 to minimize interference power by the AIC tones 303 in the interference avoidance band 301 is $N_{i\_partial}$ ($N_{i\_partial} < N_i$), a column vector d1 with rows of sidelobe components $M(N_{i\_partial}-1)+1$ after upsampling of the partial interference avoidance band 306 is expressed by the following Equation (5):

$$P_1 = PSg \quad \text{Eq. (5)}$$

In Equation (5), PS denotes a partial matrix of $(M(N_{i\_partial}-1)+1) \times N$ obtained by extracting Mu to $M(u+N_{i\_partial})$ rows corresponding to the sidelobe components after upsampling of the partial interference avoidance band 306 as matrix P with P(l, k) as elements, and g denotes a column vector with N rows constructed of the interference avoidance band and transmission symbols with components corresponding to the AIC tones set to zero. Further, u denotes a start subcarrier number of the partial interference avoidance band 306 before upsampling.

Signals to cancel the sidelobe components in the partial interference avoidance band 306 are expressed by the following Equation (6):

$$P_1 h = -d_1 \quad \text{Eq. (6)}$$

Assuming here that the number of AIC tones is $N_{AIC}$, $P_1$ denotes a partial matrix of $(M(N_{i\_partial}-1)+1) \times (N_{i\_partial}+N_{AIC})$ obtained by extracting u-$N_{AIC}$ to u+$N_{i\_partial}-1$ columns of the matrix PS in consideration of only the rows corresponding to the partial interference avoidance band 306, and h denotes a column vector with $(N_{i\_partial}+N_{AIC})$ rows of AIC symbols to cancel the interference components.

Since the matrix P1 is not a square matrix, the column vector h is determined by a minimum mean square error method. From Equation (6), a square error $e^2$ is expressed, for example, by the following Equation (7):

$$e^2 = \|P_1 h + d_1\|^2 \quad \text{Eq. (7)}$$

From Equation (7), the column vector h to cancel the interference components is expressed by the following Equation (8):

[Math. 5]

$$h = -(P_1^T P_1)^{-1} P_1^T d_1 = -(P_1^T P_1)^{-1} P_1^T P_s g = -Wg \quad \text{Eq. (8)}$$

Here, W denotes a matrix of $(N_{i\_partial}+N_{AIC}) \times N$ corresponding to output signals of the AIC coefficient generator 5161. Thus, the column vector h of AIC symbols to cancel the interference components can be calculated from the matrix W and the column vector g of transmission symbols, where the column vector h of AIC symbols corresponds to the output of the AIC coefficient multiplier 5162. The column vector h of AIC symbols is constructed of $N_{i\_partial}+N_{AIC}$ elements, but only the elements corresponding to $N_{AIC}$ may be used as AIC symbols.

Figure 14:
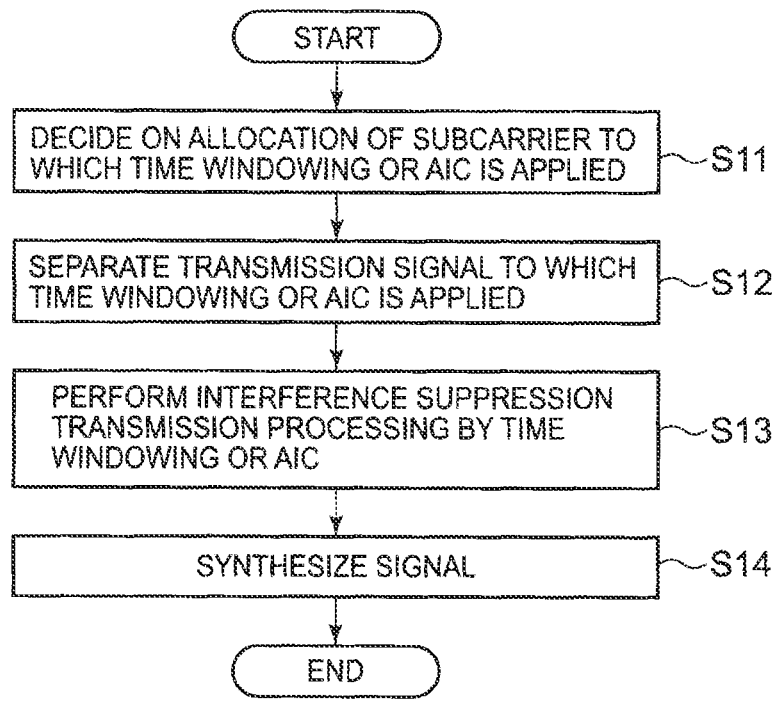
FIG. 14 is a flowchart showing an example of transmission operation of a base band unit 500.

Next, the operation of the exemplary embodiment will be described. FIG. 14 is a flowchart showing an example of transmission operation of the base band unit 500 in the exemplary embodiment. The following will mainly describe the operation of the time windowing/AIC allocation deciding section 509 and the subcarrier mapping section 511. To be more specific, description will be made on an operation for adaptively changing the range of allocation of transmission subcarriers to which time windowing is applied and the range of allocation of transmission subcarriers to which AIC is applied, depending on the interference suppression requesting information such as a spectrum mask. The other operations are as mentioned above.

In the example shown in FIG. 14, the time windowing/AIC allocation deciding section 509 refers to the interference suppression requesting information to decide on subcarriers to which time windowing is applied and subcarriers to which AIC is applied, and outputs the allocation results as time windowing/AIC allocation results (step S11). The allocation of subcarriers can be controlled, for example, by using the control method shown in FIG. 4.

Based on the time windowing/AIC allocation results, the subcarrier mapping section 511 outputs modulated symbols by separating them into the subcarriers for performing time windowing processing and the subcarriers for performing AIC processing (step S12).

In step S13, as interference suppression transmission processing on the subcarriers for performing time windowing processing, the IFFT 512-1, the P/S converter 513-1, the CP adding section 514-1, and the time windowing section 515 perform predetermined processing sequentially to generate an OFDM signal after being subjected to time windowing processing. On the other hand, as interference suppression transmission processing on the subcarriers for performing AIC processing, the AIC symbol generator 516, the IFFT 512-2, the P/S converter 513-2, and the GI adding section 514-2 perform predetermined processing sequentially to generate an OFDM signal after being subjected to AIC processing.

When the OFDM signal after being subjected to time windowing processing and the OFDM signal after being subjected to AIC processing are generated, respectively, the adder 517 synthesizes both signals and outputs the synthesized signal as a transmission modulated signal (step S14). Both signals can be transmitted, respectively, without being subjected to synthesis processing.

Figure 15:
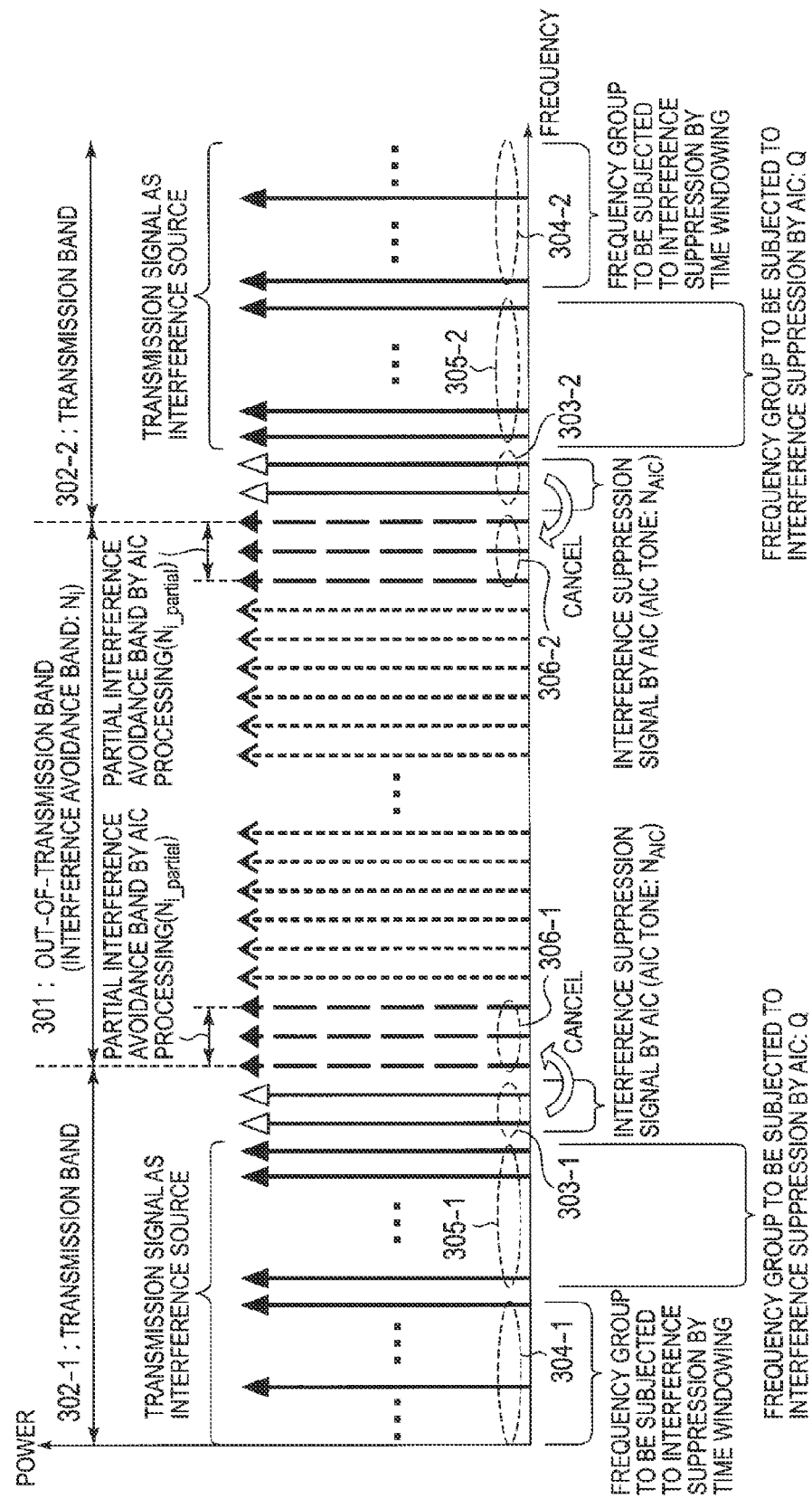
FIG. 15 is a schematic diagram showing still another example of the arrangement of subcarriers of transmission signals.
Figure 16:
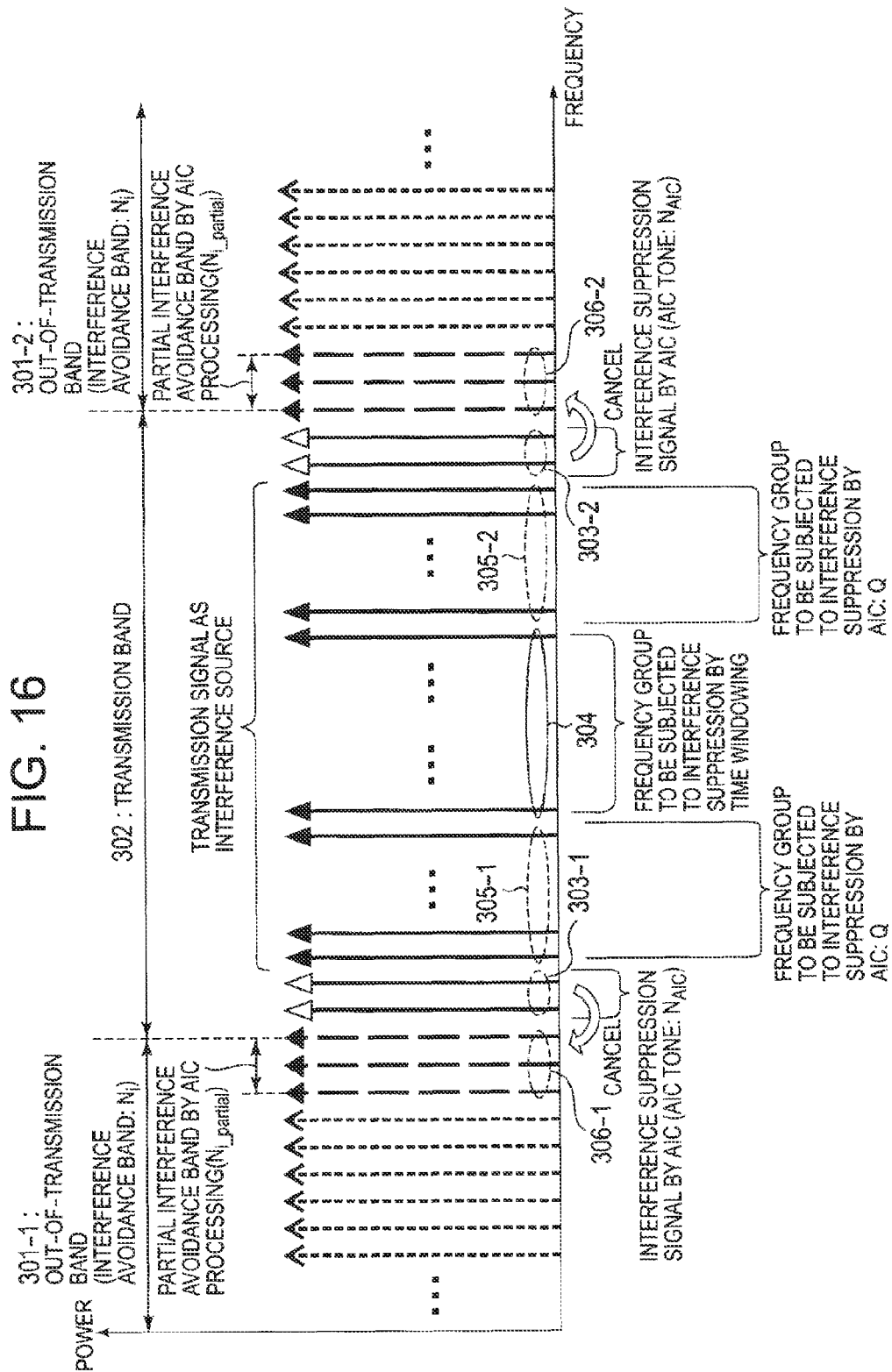
FIG. 16 is a schematic diagram showing yet another example of the arrangement of subcarriers of transmission signals.

FIG. 15 and FIG. 16 are schematic diagrams showing other examples of the arrangement of subcarriers of transmission signals. The example shown in FIG. 15 is an example in which, when the wireless transmission device provides transmission by using transmission bands 302-1 and 302-2 provided on both sides of an interference avoidance band 301, the interference suppression processing of the exemplary embodiment is applied to transmission signals in the transmission band 302-1 and 302-2 arranged on both sides of the interference avoidance band 301. As shown in FIG. 15, when there are two or more transmission bands close to the interference avoidance band, the interference suppression processing of the exemplary embodiment just has to be applied by focusing attention on respective portions in which the interference avoidance band comes close to the transmission bands.

For example, in the example shown in FIG. 15, it is only necessary to focus attention on a position relationship between the transmission band 302-1 and the interference avoidance band 301 so as to decide on band frequencies near the interference avoidance band 301 in the transmission band 302-1 to be a frequency group 305-1 in which interference is suppressed by AIC and to decide on band frequencies located far away to be a frequency group 304-1 in which interference is suppressed by time windowing. Further, it is only necessary to focus attention on a position relationship between the transmission band 302-2 and the interference avoidance band 301 so as to decide on band frequencies near the interference avoidance band 301 in the transmission band 302-2 to be a frequency group 305-2 in which interference is suppressed by AIC and to decide on band frequencies located far away to be a frequency group 304-2 in which interference is suppressed by time windowing. Further, in the transmission bands 302-1 and 302-2, AIC tones 303-1 and 303-2 are arranged in positions adjacent to the interference avoidance band 301, respectively. When there are two or more frequency groups Q to be subjected to interference suppression by AIC, calculations related to the generation and insertion of an AIC tone just have to be made per frequency group Q. If parallel processing is required, two or more calculation sections may be provided.

The example shown in FIG. 16 is an example in which, when the wireless transmission device transmits transmission signals by using, as a transmission band 302, an area sandwiched between two interference avoidance areas 301-1 and 301-2, the interference suppression processing of the exemplary embodiment is applied to transmission signals in the transmission band 302. Like in the example shown in FIG. 15, when there are two or more interference avoidance bands on both sides of the transmission band, the interference suppression processing of the exemplary embodiment may be applied by focusing attention on respective portions in which the interference avoidance bands come close to the transmission band. However, as shown in FIG. 16, there can be another method as follows: Portions in which the transmission band comes close to the interference avoidance bands on both sides thereof are paired to first decide on a frequency group Q to be subjected to interference suppression processing by AIC based on two portions in which the transmission band comes close to the interference avoidance bands on the both sides thereof to decide on the others to be a frequency group to be subjected to interference suppression processing by time windowing.

For example, in the example shown in FIG. 16, the frequency groups 305-1 and 305-2 to be subjected to interference suppression by AIC are decided based on positions in which the interference avoidance bands 301-1 and 301-2 come close to the transmission band 302 on the both sides thereof to decide the other areas to be the frequency group 304 to be subjected to interference suppression by time windowing. In this example, AIC tones 303-1 and 303-2 are arranged in respective positions adjacent to the interference avoidance band 301-1 and the interference avoidance band 301-2 inside the transmission band 302.

The above description shows the examples of deciding on the number of AIC tones in a unit of subcarrier, but it is not limited to the unit of subcarrier as long as it is a unit of radio resource.

Figure 17:
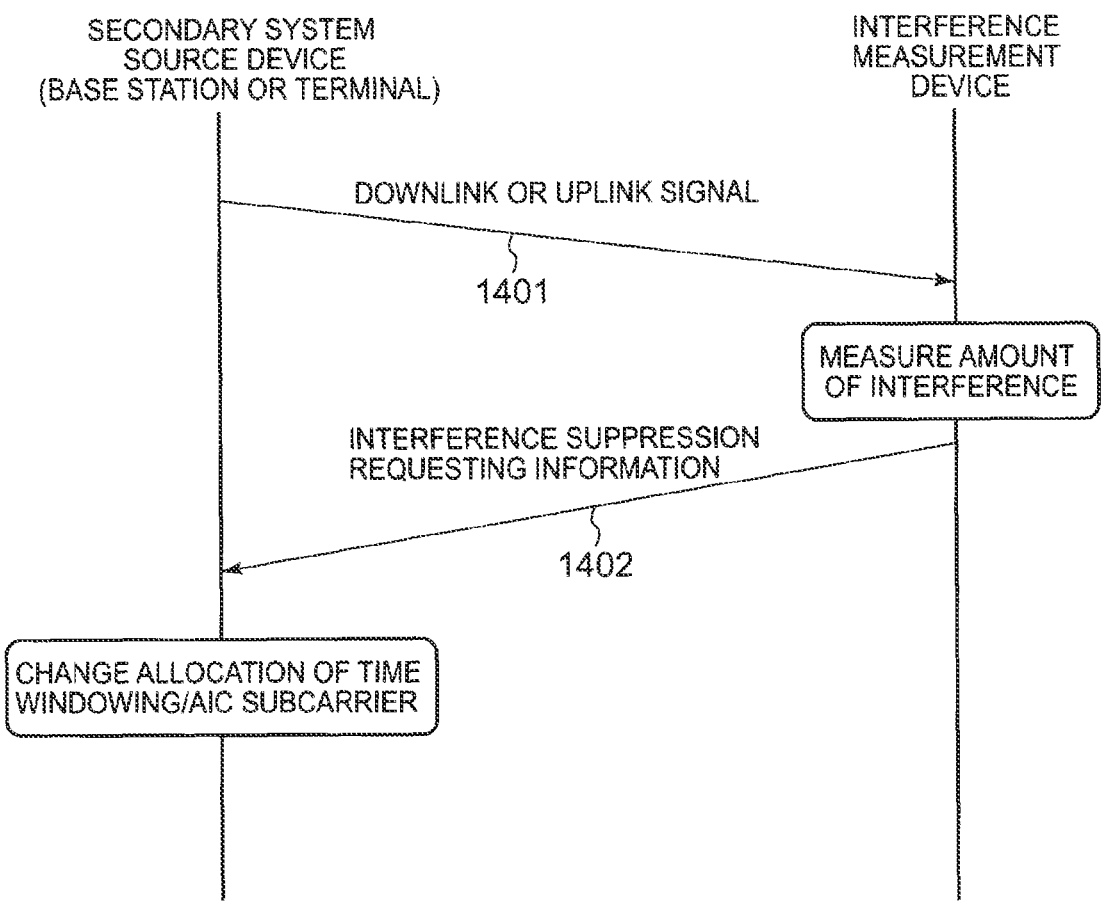
FIG. 17 is a sequence chart showing an example of operation for acquiring interference suppression requesting information.

Next, an acquisition method for interference suppression requesting information will be described. FIG. 17 is a sequence chart showing an example of operation for acquiring interference suppression requesting information. The example shown in FIG. 17 is an example in which the wireless transmission device of the exemplary embodiment is used as a source device in the secondary system (e.g., a base station or terminal) to acquire interference suppression requesting information from an interference measurement device separately provided. Here, the interference measurement device is a device for measuring or estimating the amount of interference given from the secondary system source device to the primary system to decide on interference suppression requesting information based on the result. In the example shown in FIG. 17, there is shown a procedure in which the interference measurement device decides on interference suppression requesting information and notifies the secondary system source device of the interference suppression requesting information.

The interference measurement device (e.g., a secondary system terminal station or base station, or a primary system terminal station or base station) detects a downlink or uplink signal 1401 so that the secondary system source device will measure or estimate, from the detected downlink or uplink signal 1401, the amount of interference given to the primary system. Then, based on the measured or estimated amount of interference, interference suppression requesting information is decided. Here, examples of the amount of interference include interference power, a signal power-to-interference power ratio, a signal power-to-noise power ratio, and the communication quality of the primary system. Further, for example, the interference suppression requesting information may be decided to increase the requirement of interference suppression when the amount of interference is large or to reduce the requirement of interference suppression when the amount of interference is small. Next, the interference suppression requesting information is notified to the wireless transmission device as the secondary system source device (e.g., a base station or terminal station) through a line 1402 reverse to an interference suppression control line.

In the wireless transmission device notified of the interference suppression requesting information, for example, the time windowing/AIC allocation deciding section 509 changes the allocation of interference suppression processing per subcarrier according to the content notified.

Note that the interference measurement device may execute this sequence of actions at predetermined timing (every set cycle, according to a user instruction, or the like), or in response to a request from the wireless transmission device as the secondary system source device.

Figure 18:
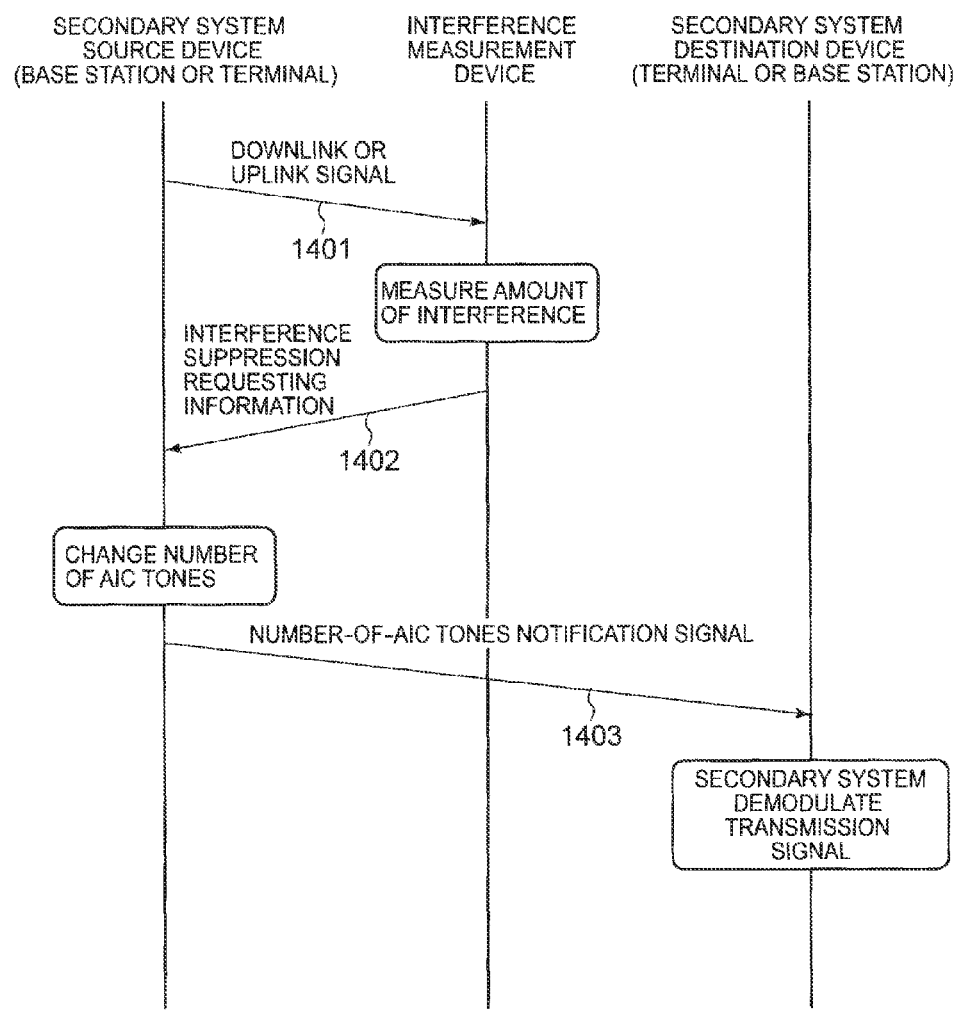
FIG. 18 is a sequence chart showing an example of operation for changing the number of AIC tones.

FIG. 18 is a sequence chart showing an example of operation for changing the number of AIC tones when the number of AIC tones is changed based on the interference suppression requesting information. In the example shown in FIG. 18, the wireless transmission device as the secondary system source device acquires interference suppression requesting information, decides on the number of AIC tones according to the acquired interference suppression requesting information, and notifies a secondary system destination device (e.g., a secondary system terminal station or base station) thereof.

As shown in FIG. 18, the secondary system source device (the wireless transmission device concerned) acquires the interference suppression requesting information, for example, by the same procedure as in the example shown in FIG. 17.

The secondary system source device that acquired the interference suppression requesting information decides on the number of AIC tones according to the acquired interference suppression requesting information 1402, and notifies the secondary system destination device of the decided number of AIC tones as a number-of-AIC tones notification signal 1403. The AIC is such that the more the number of AIC tones, the more interference suppression performance by the AIC is improved, whereas the less the number of AIC tones, the more the interference suppression performance is reduced. Here, for example, the number of AIC tones may be decided as follows: When the interference suppression requirement is strong, the number of AIC tones is increased, while when the interference suppression requirement is weak, the number of AIC tones is reduced. The decision on the number of AIC tones may be made, for example, as part of interference suppression allocation processing or subcarrier mapping processing by the time windowing/AIC allocation deciding section 509.

The secondary system destination device just has to refer to the notified number-of-AIC tones notification signal 1403 to perform receiving processing without decoding, as data, subcarriers corresponding to the number of AIC tones.

The above description shows the example in which the interference measurement device decides on the interference suppression requesting information 1402. However, since it can be considered that the interference suppression requesting information 1402 is decided by the secondary system source device, information on the transmission power density of the secondary system source device, a database related to the primary system CPC (Cognitive Pilot Channel), the sensing results, an interference avoidance bandwidth, frequency spacing from the interference avoidance band, propagation loss between the secondary system transmitting device and a primary system receiving device, the directivity of a transmitted beam, and the like, may be referred to as determination information to make a decision.

Further, the above description shows the example of changing the number of AIC tones according to the interference suppression requesting information, but the partial interference avoidance bandwidth may be changed according to the interference suppression requesting information to generate AIC tones. For example, as a result of referring to the interference suppression requesting information, if it is desired to form a deep notch with a narrow bandwidth in the partial interference avoidance band, the partial interference avoidance bandwidth will be reduced. On the other hand, if it is desired to form a shallow notch with a wide bandwidth in the partial interference avoidance band, the interference avoidance bandwidth will be changed to be wider.

Furthermore, the partial interference avoidance bandwidth may be changed according to the number of AIC tones. For example, when the number of AIC tones is small, the partial interference avoidance bandwidth may be reduced, while when the number of AIC tones is large, the partial interference avoidance bandwidth may be increased.

FIG. 19 to FIG. 21 are explanatory drawings showing examples of tables when parameters for interference suppression processing (including the allocation of frequency groups) are changed based on the allocation determination information.

FIG. 19 is an explanatory drawing showing examples of tables when the number of subcarriers Q to be subjected to interference suppression by AIC is changed according to the interference suppression requesting information. For example, as shown in FIG. 19, the interference suppression requesting information may be subdivided into one or more parameters, such as request information in the partial interference avoidance band 306 by AIC and request information in a band excluding the partial interference avoidance band 306 by AIC. FIG. 19(a) is an explanatory drawing showing an example of a table having the number of subcarriers Q to be subjected to interference suppression by AIC in association with interference suppression requesting information in the partial interference avoidance band 306. FIG. 19(b) is an explanatory drawing showing an example of a table having the number of subcarriers Q to be subjected to interference suppression by AIC in association with interference suppression requesting information in a band other than the partial interference avoidance band 306.

For example, as shown in FIG. 19(a), such values to reduce the number of subcarriers Q to be subjected to interference suppression by AIC when the interference suppression requesting information (partial interference avoidance band) is weak and to increase the number of subcarriers Q to be subjected to interference suppression by AIC when the interference suppression requesting information (partial interference avoidance band) is strong may be registered to decide on the number of subcarriers Q to be subjected to interference suppression by AIC based on the value.

Further, for example, as shown in FIG. 19(b), such values to reduce the number of subcarriers Q to be subjected to interference suppression by AIC when the interference suppression requesting information (bands other than the partial interference avoidance band) is strong and to increase the number of subcarriers Q to be subjected to interference suppression by AIC when the interference suppression requesting information (band excluding the partial interference avoidance band) is weak may be registered to decide on the number of subcarriers Q to be subjected to interference suppression by AIC based on the value.

It is preferred that the transmission subcarriers that are not subjected to interference suppression by AIC should be subjected to interference suppression by time windowing, but it is also possible not to perform interference suppression processing without applying time windowing.

FIG. 20 is an explanatory drawing showing examples of tables when the number of AIC tones is changed according to interference suppression requesting information. FIG. 20(a) is an explanatory drawing showing an example of a table having the number of AIC tones in association with interference suppression requesting information in the partial interference avoidance band 306. FIG. 20(b) is an explanatory drawing showing an example of a table having the number of AIC tones in association with interference suppression requesting information in a band excluding the partial interference avoidance band 306 by AIC.

For example, as shown in FIG. 20(a), such values to reduce the number of AIC tones when the interference suppression requesting information (partial interference avoidance band) is weak and to increase the number of AIC tones when the interference suppression requesting information (partial interference avoidance band) is strong may be registered to decide on the number of AIC tones based on the value.

Further, for example, as shown in FIG. 20(b), such values to reduce the number of AIC tones when the interference suppression requesting information (band excluding the partial interference avoidance band) is strong and to increase the number of AIC tones when the interference suppression requesting information (band excluding the partial interference avoidance band) is weak may be registered to decide on the number of AIC tones based on the value.

FIG. 21 is an explanatory drawing showing examples of tables when a partial interference avoidance bandwidth by AIC is changed according to interference suppression requesting information. FIG. 21(a) is an explanatory drawing showing an example of a table having the partial interference avoidance bandwidth by AIC in association with interference suppression requesting information in the partial interference avoidance band 306. FIG. 21(b) is an explanatory drawing showing an example of a table having the partial interference avoidance bandwidth by AIC in association with interference suppression requesting information in a band excluding the partial interference avoidance band 306 by AIC. FIG. 21(c) is an explanatory drawing showing an example of a table having the partial interference avoidance bandwidth by AIC in association with the number of AIC tones.

For example, as shown in FIG. 21(a), such values to widen the partial interference avoidance bandwidth by AIC when the interference suppression requesting information (partial interference avoidance band) is weak and to narrow the partial interference avoidance bandwidth by AIC when the interference suppression requesting information (partial interference avoidance band) is strong may be registered to decide on the Partial interference avoidance bandwidth by AIC based on the value. The example shown in FIG. 21(a) is used to form a shallow notch with a wide bandwidth by AIC when the interference suppression requesting information is weak or to form a deep notch with a narrow bandwidth by AIC when the interference suppression requesting information is strong.

Further, for example, as shown in FIG. 21(b), such values to narrow the partial interference avoidance bandwidth by AIC when the interference suppression requesting information (partial interference avoidance band) is weak and to widen the partial interference avoidance bandwidth by AIC when the interference suppression requesting information (partial interference avoidance band) is strong may be registered to decide on the partial interference avoidance bandwidth by AIC based on the value. The example shown in FIG. 21(b) is used to form a deep notch with a narrow bandwidth by AIC when the interference suppression requesting information is weak or to form a shallow notch with a wide bandwidth by AIC when the interference suppression requesting information is strong.

Further, for example, as shown in FIG. 21(c), such values to narrow the partial interference avoidance bandwidth by AIC when the number of AIC tones is small and to widen the partial interference avoidance bandwidth by AIC when the number of AIC tones is large may be registered to decide on the partial interference avoidance bandwidth by AIC based on the value.

Figure 22A:
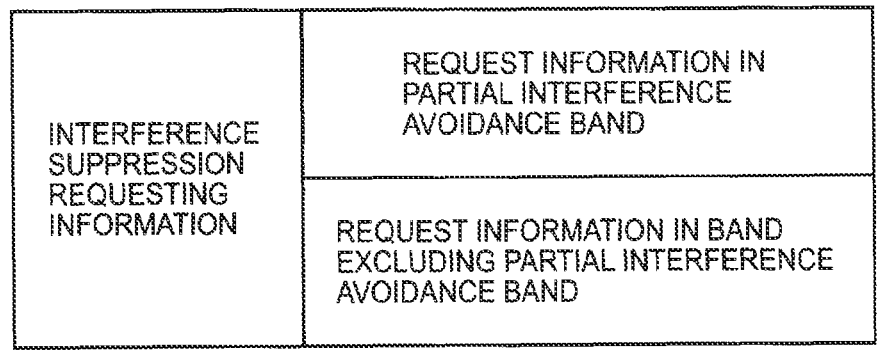
FIG. 22 is an explanatory drawing showing examples of interfaces for interference suppression requesting information notified from an interference measurement device to a secondary system source device (the wireless transmission device concerned).

FIG. 22 shows examples of interfaces for control information as the interference suppression requesting information and the allocation determination information notified from the interference measurement device to the secondary system source device (the wireless transmission device concerned). FIG. 22(a) shows an example of giving notice of request information in the partial interference avoidance band and request information in a band excluding the partial interference avoidance band as interference suppression requesting information. In the example shown in FIG. 22(a), for example, request information may be represented as a numerical value in such a manner that the larger the numerical value, the higher the degree of request for interference suppression, while the smaller the numerical value, the lower the degree of request for interference suppression. Note that the partial interference avoidance band and the band excluding the partial interference avoidance band can be so replaced that the partial interference avoidance band will be placed near the transmission band and the band excluding the he partial interference avoidance band will be placed away from the transmission band. Further, one numerical value indicative of the degree of request may be notified as request information for interference suppression across the entire interference avoidance band without dividing the information into the request information in the partial interference avoidance band and the request information in the band excluding the partial interference avoidance band.

Figure 22B:
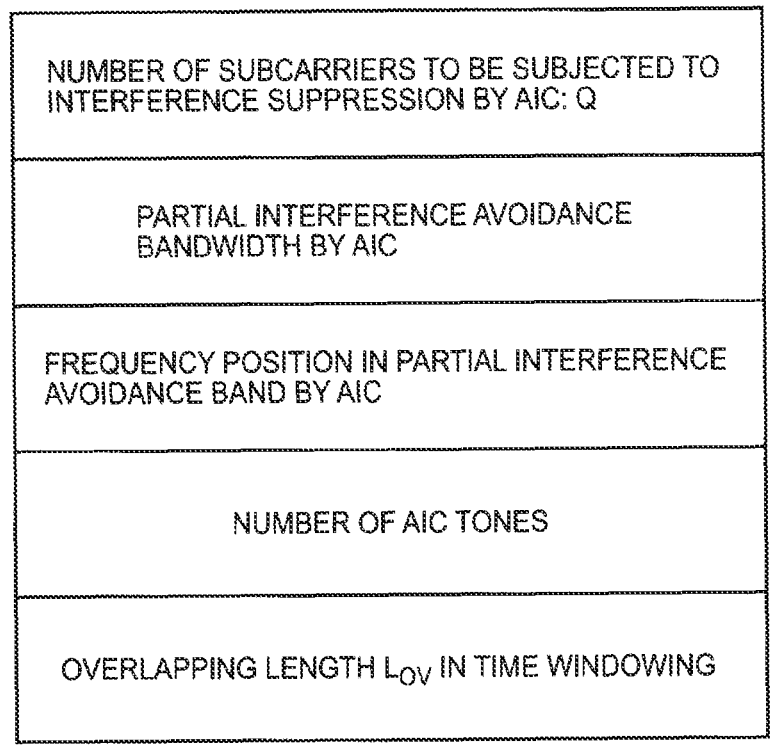

FIG. 22(b) is an explanatory drawing showing an example of an interface for control information. As shown in FIG. 22(b), various kinds of control information as parameters for interference suppression processing can be acquired from the interference measurement device or the like based on the interface for control information and reflected in various operation settings. In the example shown in FIG. 22(b), information including the number of subcarriers Q to be subjected to interference suppression by AIC, the partial interference avoidance bandwidth by AIC, frequency positions in the partial interference avoidance band by AIC, the number of AIC tones, and the overlapping length $L_{OV}$ in time windowing is shown as control information. Note that some of these pieces of information may be notified, or limit information indicative of the upper limit and the lower limit of these values or a variable range can be notified.

In the above example, the interference suppression requesting information and various kinds of control information are acquired from the interference measurement device. The interference measurement device may be included in the primary system or the secondary system, or may exist as an independent device. Further, the interference suppression requesting information and the various kinds of control information may be acquired from a higher-level apparatus for managing the secondary system, the primary system, or one or more systems.

Further, the interference suppression requesting information and the various kinds of control information may be represented as a numerical value including binary information indicative of 0 or 1 to given notice of a difference value upon state transition from the previous state to the current state.

As described above, according to the exemplary embodiment, the interference suppression performance of the interference avoidance band in the secondary system can be improved. Further, the ranges of allocation of subcarriers to which time windowing and AIC are applied, respectively, can be changed according to the interference suppression requesting information to flexibly control the leakage power density of the interference avoidance band in consideration of interference with the primary system. Similarly, the number of AIC tones can be changed according to the interference suppression requesting information to flexibly control the leakage power density of the interference avoidance band in consideration of interference with the primary system. Note that the wireless transmission device of the exemplary embodiment is required to perform new IFFT computing compared to the structure to which only AIC is applied, but the amount of increase in IFFT computing is lower than a digital filter or an error correcting decoder required to carry out a convolution multiplication.

Figure 23:
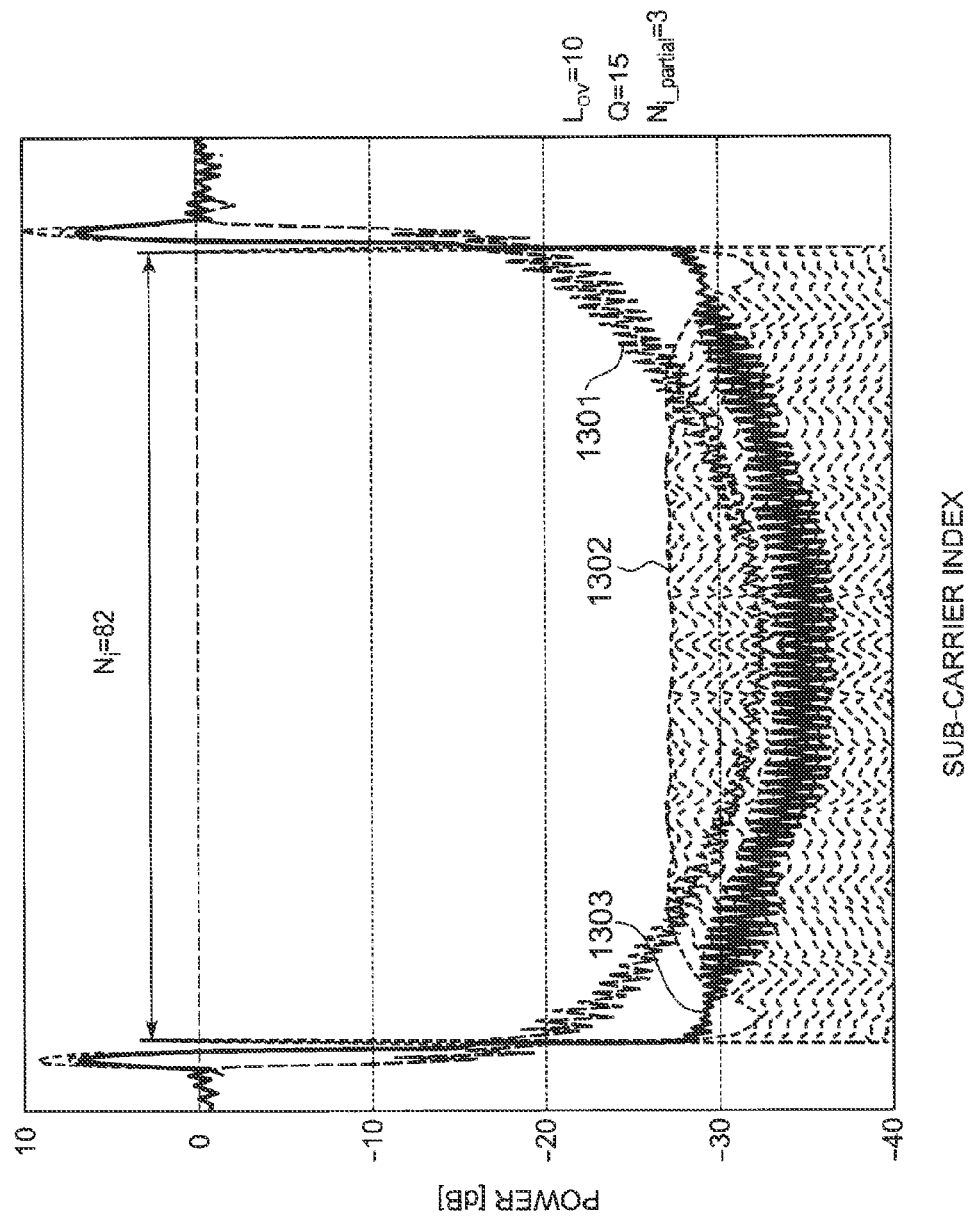
FIG. 23 is an explanatory drawing showing a simulation result of the second exemplary embodiment.

FIG. 23 is a simulation result showing the effects of the exemplary embodiment. In FIG. 23, subcarrier is plotted on the abscissa and power [dB] is plotted on the ordinate. The simulation result shown in FIG. 23 is an example in which the secondary system provided transmission on both sides of the interference avoidance band and the interference suppression processing of the exemplary embodiment was applied to transmission signals arranged on both sides of the interference avoidance band. In FIG. 23, there is shown a comparison of interference among three methods, namely, an interference suppression transmission signal 1301 by time windowing, an interference suppression transmission signal 1302 by CC in NPL 2, and an interference suppression transmission signal 1303 according to the exemplary embodiment. In each method, the number of transmission subcarriers was 514 and the number of subcarriers of the interference avoidance bandwidth was $N_i$=82. Further, four AIC tones in total at both ends were arranged with AIC tones of $N_{AIC}$=2 on the boundaries between the transmission bands and the interference avoidance band, respectively. Further, the number of subcarriers (Q) as interference sources in the transmission bands to be subjected to interference suppression by AIC was 15 near the interference avoidance band, and the remaining subcarriers as interference sources located away from the interference avoidance band were subjected to interference suppression by time windowing. The number of subcarriers in partial interference avoidance bands by AIC in the interference avoidance band was $N_{i\_partial}=3$, and the partial interference avoidance bands were arranged at both ends of the interference avoidance bands to generate AIC tones. Further, the FFT size was N=1024, the CP length was $L_{CP}=63$, both the Window overlapping length of the interference suppression transmission signal 1301 by time windowing and the Window overlapping length of time windowing of the interference suppression transmission signal 1303 according to the exemplary embodiment were $L_{OV}=10$, and QPSK (Quadrature Phase Shift Keying) with symbol power of 1 was used as the modulation system.

As apparent from FIG. 23, the interference suppression transmission signal 1301 by time windowing was not able to achieve a sufficient interference suppression effect in frequency positions near the transmission bands. The interference suppression transmission signal 1302 by CC in NPL 2 was not able to achieve a sufficient interference suppression effect in the interference avoidance band at points distant from the transmission bands. In contrast, the interference suppression transmission signal 1303 according to the exemplary embodiment was able to achieve a sufficient interference suppression effect across the entire interference avoidance band, and it was found that out-of-band leakage power could be reduced.

Exemplary Embodiment 3

Figure 24:
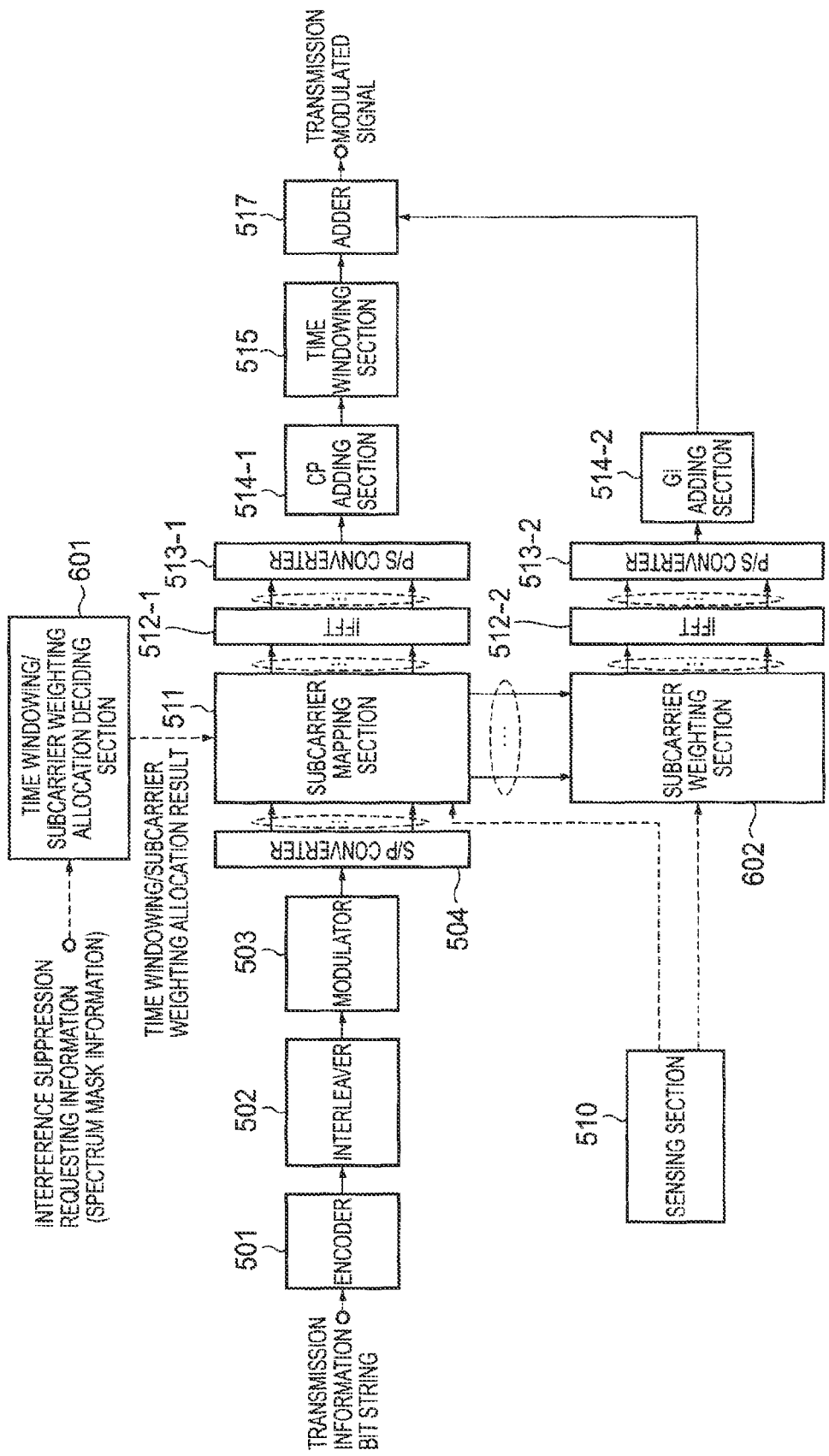
FIG. 24 is a block diagram showing an example of the structure of a base band unit in a third exemplary embodiment.

Next, a third exemplary embodiment of the present invention will be described with reference to a drawing. FIG. 24 is a block diagram showing an example of the structure of a base band unit in the third exemplary embodiment. The example shown in FIG. 24 is an example of a more specific structure in which, in the structure shown in FIG. 1, subcarrier weighting is adopted as an interference suppression transmission method by frequency-domain processing and time windowing is adopted as an interference suppression transmission method by time-domain processing. Points in which a base band unit 600 shown in FIG. 24 differs from the base band unit 500 in the second exemplary embodiment shown in FIG. 8 are that a time windowing/subcarrier weighting allocation deciding section 601 is provided instead of the time windowing/AIC allocation deciding section 509 and a subcarrier weighting section 602 is provided instead of the AIC symbol generator 516. The other points may be the same as those in the second exemplary embodiment.

In the exemplary embodiment, some subcarriers of transmission signals (transmission signals on which time windowing is not performed) are subjected to interference suppression transmission by subcarrier weighting. Subcarrier weighting is an interference suppression transmission method for multiplying a symbol to be converted to a subcarrier signal by an appropriate weight to suppress leakage power so as to reduce leakage sidelobe power of the partial interference avoidance band in the interference avoidance band.

In the time windowing/subcarrier weighting allocation deciding section 601, a subcarrier to which subcarrier weighting is applied just has to be decided upon allocation of interference suppression processing to each subcarrier of transmission signal by the same method as that when a subcarrier to be subjected to interference suppression by AIC (e.g., the subcarrier 305 shown in FIG. 13) is decided in the second exemplary embodiment.

In the subcarrier weighting section 602, the subcarrier 305 is multiplied by a weight coefficient of a real number so that it will be small as a result of combining multiple sidelobe components of the subcarrier 305 to be subjected to interference suppression by subcarrier weighting in the partial interference avoidance band 306 of the interference avoidance band 301, and output to the downstream IFFT 512-2. As a modification of subcarrier weighting, the subcarrier weighting section 602 may multiply the subcarrier 305 by a weight coefficient of a complex number.

The operation of the base band unit 600 of the exemplary embodiment just has to replace AIC with subcarrier weighting in the operation of the base band unit 500 in the second exemplary embodiment shown in FIG. 14. Specifically, in steps S11 to S13 in FIG. 14, the operation of step S11 just has to be performed by the time windowing/subcarrier weighting allocation deciding section 601. Further, interference suppression transmission processing for a subcarrier on which AIC processing is performed in step S13 just has to be performed by the subcarrier weighting section 602, the IFFT 512-2, the P/S converter 513-2, and the GI adding section 514-2. The other points may be the same as those in the second exemplary embodiment.

When subcarrier weighting is applied, there is an advantage in eliminating the need to insert a dedicated symbol for suppression of leakage power like in the case of AIC.

Besides AIC and subcarrier weighting, spectrum coding can also be adopted as an interference suppression transmission method for a frequency domain. When spectrum coding is applied, spectrum coding section for giving a correlation between symbols to be converted to subcarrier signals may be provided, for example, instead of the AIC symbol generator 516 shown in FIG. 8.

The interference suppression transmission method by time-domain processing is also not limited to time windowing. For example, any other method such as a digital filter for filtering frequencies in time-domain processing can be adopted. Further, the interference suppression transmission method by the frequency-domain processing is not limited to AIC, subcarrier weighting, and spectrum coding, and any other method can be adopted.

In the above description, the example of using interference suppression requesting information as allocation determination information is mainly shown, but any information other than the interference suppression requesting information can be used as the allocation determination information.

Further, in the above description, the example of always using the time windowing processing system and the AIC processing system concurrently to suppress interference in one or two interference avoidance bands is taken. However, for example, when the number of interference avoidance bands (the number of band frequencies used by the primary system) is small, the time windowing processing system can be stopped to provide interference suppression transmission in the AIC processing system alone so that interference suppression transmission will be provided by using the time windowing processing system and the AIC processing system concurrently only when the number of interference avoidance bands is large.

Further, in the above description, the OFDM wireless transmission device in multicarrier transmission is taken as an example, but the structures of the first to third exemplary embodiments can be applied, for example, to DFT (Discrete Fourier Transform)-Spread OFDM in single-carrier transmission.

Further, in the above description, the case of application to the secondary system is taken as an example, but the structures of the first to third exemplary embodiments may also be applied to the primary system.

Further, the base band units of the first to third exemplary embodiments can also be implemented in predetermined hardware, for example, as a circuit. Further, for example, they can be implemented by a computer circuit (e.g., CPU (Central Processing Unit)), not shown, operating based on a control program. The control program is stored on a storage medium e.g., a ROM (Read Only Memory), a hard disk, or the like) inside the wireless transmission device or the base band unit, or an external storage medium (e.g., a removable medium, a removable disk, or the like), and read by the above-mentioned computer circuit and executed. Note that each section included in the base band units can also be implemented by a combination of predetermined hardware and a CPU or the like operating according to a program.

Figure 25:
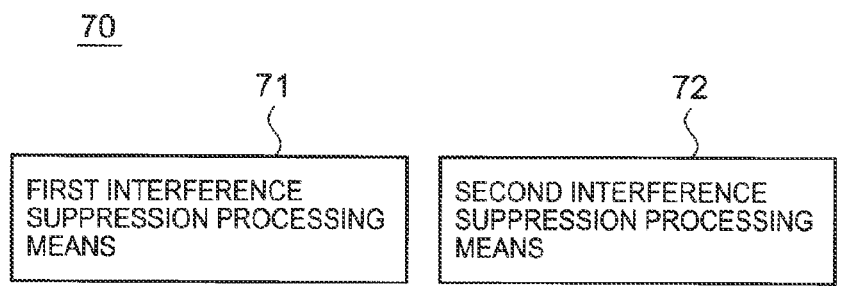
FIG. 25 is a block diagram showing a general picture of the present invention.

Next, a general picture of the present invention will be described. FIG. 25 is a block diagram showing a general picture of the present invention. A wireless transmission device 70 shown in FIG. 25 includes first interference suppression processing means 71 and second interference suppression processing means 72.

The first interference suppression processing means 71 generates an interference suppression transmission signal for partially suppressing the leakage power of a signal to an interference avoidance band by frequency-domain processing for the signal in a partial frequency band of transmission signals. In the aforementioned exemplary embodiments, the first interference suppression processing means 71 is shown as the frequency-domain interference suppression processing section 105, the AIC symbol generator 516, and the subcarrier weighting section 602. It is also possible to see a combination of the AIC symbol generator 516, the IFFT 512-2, the P/S converter 513-2, and the GI adding section 514-2 as an example of the first interference suppression processing means 71.

The second interference suppression processing means 72 generates an interference suppression transmission signal for suppressing the leakage power of a signal to the interference avoidance band by time-domain processing for the signal in a partial or entire frequency band of transmission signals. In the aforementioned exemplary embodiments, for example, the second interference suppression processing means 72 is shown as the time-domain interference suppression processing section 104 and the time windowing section 515. It is also possible to see a combination of the IFFT 512-1, the P/S converter 513-1, the CP adding section 514-1, and the time windowing section 515 as an example of the second interference suppression processing means 72.

According to such a structure, even when an interference avoidance band in which leakage power should be suppressed is wide, excellent interference suppression performance can be obtained without degrading frequency usage efficiency.

The first interference suppression processing means may perform frequency-domain processing on a signal in a frequency band close to the interference avoidance band among the transmission signals.

The second interference suppression processing means may perform time-domain processing on a signal among the transmission signals in a frequency band in which the first interference suppression processing means does not perform frequency-domain processing.

A partial band of the interference avoidance band to be targeted by the first interference suppression processing means to suppress leakage power may be near a transmission band.

Figure 26:
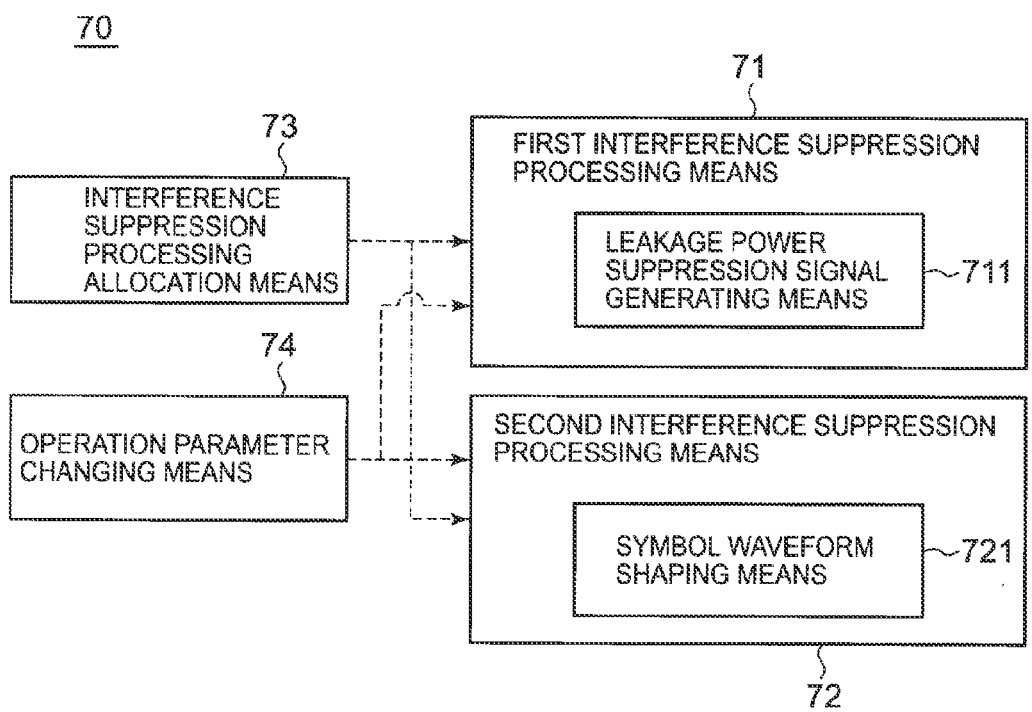
FIG. 26 is a block diagram showing another general picture of the present invention.
Figure 27:
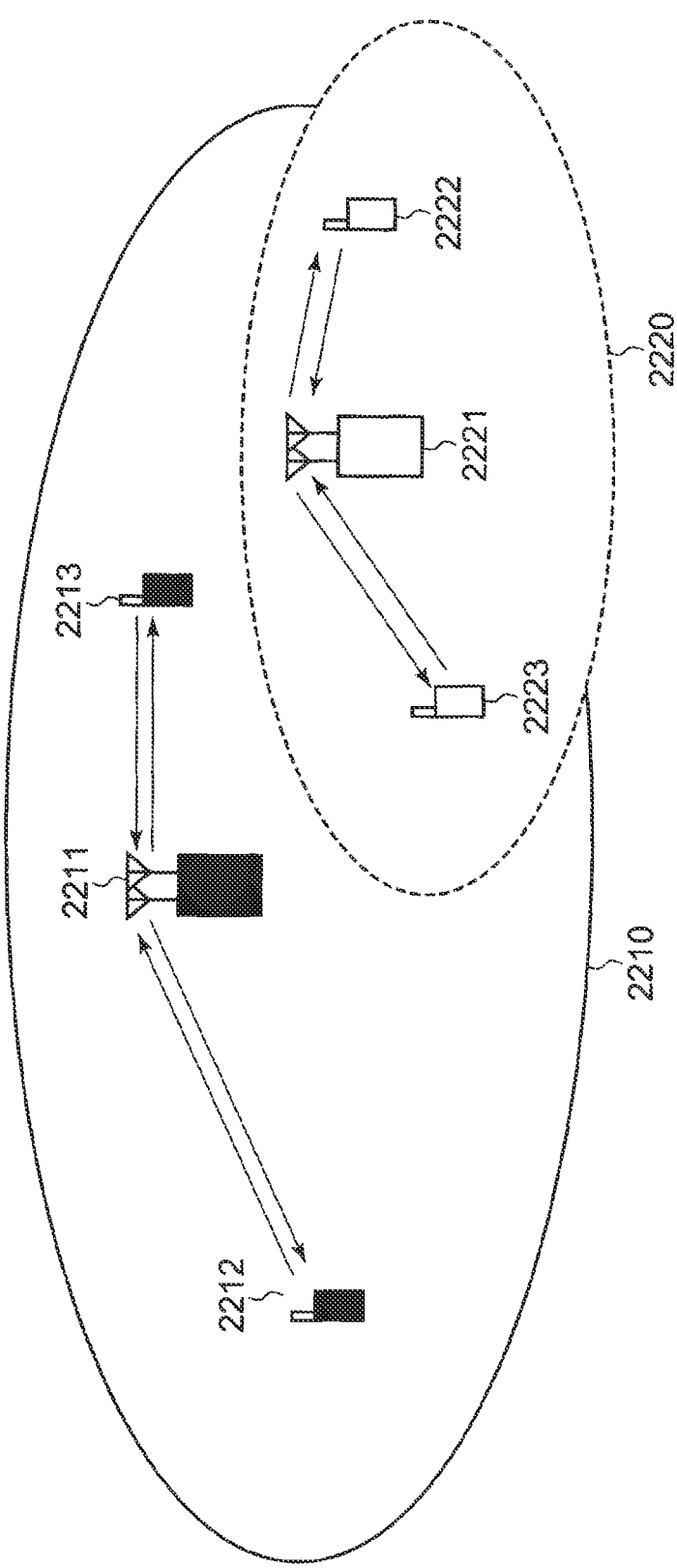
FIG. 27 is an explanatory drawing showing an example of a communication system for dynamic spectrum access.
Figure 28A:
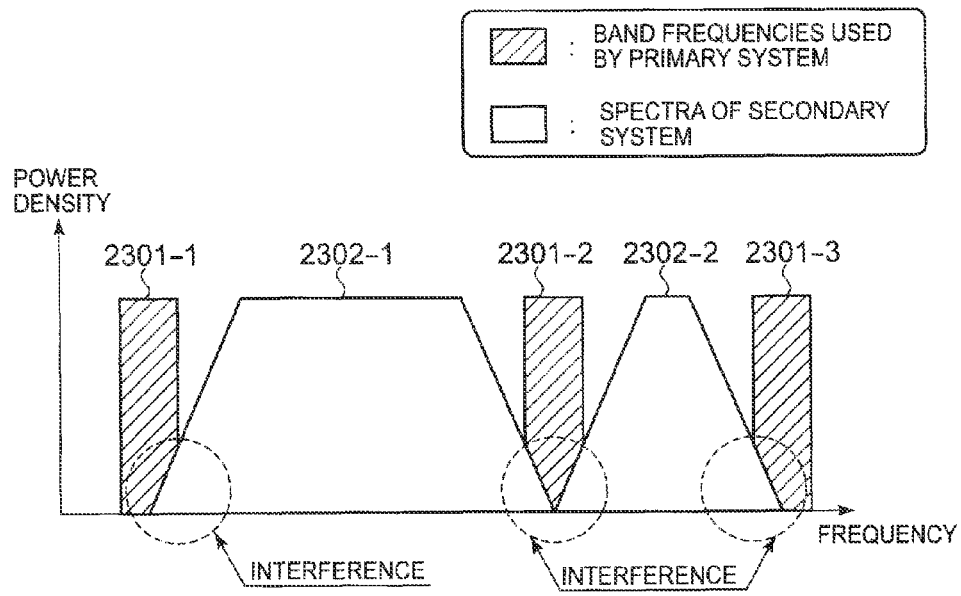
FIG. 28 is an explanatory drawing showing examples of band frequencies used by a primary system and spectra of a secondary system.
Figure 28B:
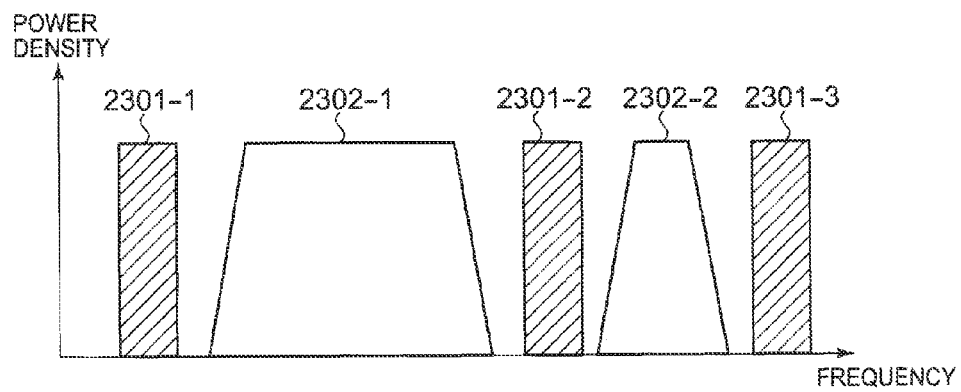

FIG. 26 is a block diagram showing another example of the structure of the wireless transmission device of the present invention. As shown in FIG. 26, the wireless transmission device of the present invention may further include interference suppression processing allocation means 73. The interference suppression processing allocation means 73 decides on a range of frequency band, on which interference suppression is performed by frequency-domain processing, and a range of frequency band, on which interference suppression is performed by time-domain processing, across the frequency band of transmission signals based on interference suppression requesting information indicative of the levels of interference suppression required. In the aforementioned exemplary embodiments, the interference suppression processing allocation means 73 is shown as the allocation of interference suppression transmission deciding section 102, the time windowing/AIC allocation deciding section 509, and the time windowing/subcarrier weighting allocation deciding section 601.

The wireless transmission device may further include operation parameter changing means 74. The operation parameter changing means 74 changes an operation parameter for the first interference suppression processing means or the second interference suppression processing means based on interference suppression requesting information indicative of the levels of interference suppression required or predetermined control information as an interference suppression processing parameter. In the aforementioned exemplary embodiment, the operation parameter changing means 74 is shown as an function of the allocation of interference suppression transmission deciding section 102.

For example, the operation parameter changing means may change the number of leakage power suppression signals according to the interference suppression requesting information or the predetermined control information and notify a destination device of the number of leakage power suppression signals after being changed.

Further, for example, according to the interference suppression requesting information or the predetermined control information, the bandwidth of a partial band of the interference avoidance band to be targeted by the first interference suppression processing means to suppress leakage power may be changed.

Further, as shown in FIG. 26, the first interference suppression processing means may include leakage power suppression signal generating means for generating a leakage power suppression signal as a signal for partially suppressing leakage power in the interference avoidance band, and the second interference suppression processing means may include symbol waveform shaping means for shaping a symbol waveform in a time domain.

Further, the leakage power suppression signal generating means may include: interference suppression symbol generating means for inputting information on the interference avoidance band and information on a transmission symbol obtained by frequency mapping a transmission signal targeted for interference suppression by frequency-domain processing, and generating a transmission signal with an interference suppression symbol inserted therein as the transmission symbol, wherein the interference suppression symbol is a symbol for suppressing leakage power to a partial band of the interference avoidance band; inverse Fourier transform means for inputting the transmission signal supplied from the interference suppression symbol generating means, and performing inverse Fourier transform processing on the transmission signal to generate a subcarrier signal; parallel/serial conversion means for inputting the subcarrier signal supplied from the inverse Fourier transform means, converting the subcarrier signal to a serial signal, and outputting the serial signal; and guard interval adding means for inputting the signal supplied from the parallel/serial conversion means, and adding a guard interval to each transmission frame on which inverse Fourier transform was performed.

Further, the wireless transmission device according to the present invention may decide on the range of frequency band, on which interference suppression is performed by frequency-domain processing, and the range of frequency band, on which interference suppression is performed by time-domain processing, in a unit of radio resource.

Further, the wireless transmission device according to the present invention may decide on the range of frequency band, on which interference suppression is performed by frequency-domain processing, and the range of frequency band, on which interference suppression is performed by time-domain processing, in a unit of subcarrier.

(Supplementary Note 1) The wireless transmission device according to the present invention may be configured to include: signal separation means for separating transmission signals in a frequency domain; first interference suppression processing means for performing frequency-domain processing on a separated signal supplied from the signal separation means to generate an interference suppression transmission signal for partially suppressing the leakage power of the signal to the interference avoidance band; and second interference suppression processing means for performing time-domain processing on a separated signal supplied from the signal separation means to generate an interference suppression transmission signal for suppressing the leakage power of the signal to the interference avoidance band, wherein the signal separation means will separate the transmission signals in a unit of radio resource into a group to be subjected to interference processing by the first interference processing means and a group to be subjected to interference processing by the second interference processing means.

(Supplementary Note 2) In the wireless transmission device according to the present invention, the symbol waveform shaping means may be configured to include: inverse Fourier transform means for inputting a transmission signal to be subjected to interference suppression by time-domain processing, and performing inverse Fourier transform processing on the transmission signal to generate a subcarrier signal; parallel/serial conversion means for inputting the subcarrier signal supplied from the inverse Fourier transform means, converting the subcarrier signal to a serial signal, and outputting the serial signal; cyclic prefix adding means for inputting the signal supplied from the parallel/serial conversion means, and adding a cyclic prefix to each transmission frame on which inverse Fourier transform was performed; and means for waveform shaping both ends of a symbol, for inputting the signal with the cyclic prefix added thereto and output from the cyclic prefix adding means, and shaping the waveforms of both ends of the symbol in a time domain.

(Supplementary Note 3) In the wireless transmission device according to the present invention, frequency-domain processing may be performed on a signal in a frequency band close to the interference avoidance band among the transmission signals.

(Supplementary Note 4) In the wireless transmission method according to the present invention, time-domain processing may be performed on a signal in a frequency band in which no interference suppression transmission signal is generated by frequency-domain processing among the transmission signals.

Generation processing for an interference suppression transmission signal by the frequency-domain processing and generation processing for an interference suppression transmission signal by the time-domain processing may be parallel processing, or the generation processing for an interference suppression transmission signal by the time-domain processing may be performed after the generation processing for an interference suppression transmission signal by the frequency-domain processing.

(Supplementary Note 5) Further, the wireless transmission method according to the present invention may decide on a range of frequency band, on which interference suppression is performed by frequency-domain processing, and a range of frequency band, on which interference suppression is performed by time-domain processing, across the frequency band of transmission signals based on interference suppression requesting information indicative of the levels of interference suppression required.

(Supplementary Note 6) Further, the wireless transmission program according to the present invention may cause the computer to perform, in the first interference suppression processing, frequency-domain processing on a signal in a frequency band close to the interference avoidance band among the transmission signals.

(Supplementary Note 7) Further, in the wireless communication system according to the present invention, the predetermined control information as the parameter for frequency-domain processing of part of transmission signals and time-domain processing of part or all of transmission signals performed by the wireless transmission device as interference suppression processing may be at least any one of the number of radio resources to be subjected to interference suppression by frequency-domain processing among the transmission signals, the bandwidth of a partial frequency band of the interference avoidance band targeted for suppressing leakage power in the frequency-domain processing, a frequency position in the partial frequency band of the interference avoidance band targeted for suppressing leakage power in the frequency-domain processing, the number of leakage power suppression signals to be generated for suppressing leakage power in the frequency-domain processing, and an overlapping length of anterior and posterior symbols targeted for generating a symbol waveform in the time-domain processing.

As described above, although the present invention is described with reference to the exemplary embodiments and examples, the present invention is not limited to the aforementioned exemplary embodiments and examples. Various changes that can be understood by those skilled in the art within the scope of the present invention can be made to the structures and details of the present invention.

This application claims priority based on Japanese Patent Application No. 2010-037851, filed Feb. 23, 2010, the entire disclosure of which is incorporated herein by reference.

Industrial Applicability

The present invention can be suitably applied to a device, a method, and a program required to transmit radio signals while suppressing interference with a band other than a transmission band.

REFERENCE SIGNS LIST

70 Wireless Transmission Device
71 First Interference Suppression Processing Means
72 Second Interference Suppression Processing Means
73 Interference Suppression Processing Allocation Means
74 Operation Parameter Changing Means
100 Base Band Unit
101 Modulator
102 Allocation of Interference Suppression Transmission Deciding Section
103 Signal Separation Section 104 Interference Suppression Transmission Section (Time-Domain Interference Suppression Processing Section) by Time-Domain Processing
105 Interference Suppression Transmission Section (Frequency-Domain Interference Suppression Processing Section) by Frequency-Domain Processing
106 Synthesizing Section
500 Base Band Unit
501 Encoder
502 Interleaver
503 Modulator
504 S/P Converter
509 Time Windowing/AIC Allocation Deciding Section
510 Sensing Section
511 Subcarrier Mapping Section
512-1, 2 IFFT
513-1, 2 P/S Converter
514-1 CP Adding Section
514-2 GI Adding Section
515 Time Windowing Section
5151 Tail Portion Copying Section
5152 Time-Domain Waveform Shaping Section
5153 Anteroposterior OFDM Symbol Overlapping Section
516 AIC Symbol Generator
5161 AIC Coefficient Generator
5162 AIC Coefficient Multiplier
5163 AIC Symbol Inserting Section
517 Adder
600 Base Band Unit
601 Time Windowing/Subcarrier Weighting Allocation Deciding Section
602 Subcarrier Weighting Section
801 Head Window
802 OFDM Symbol
803 Tail Window
1401 Downlink or Uplink Signal
1402 Interference Suppression Requesting Information
1403 Number-of-AIC Tones Notification Signal

The invention claimed is:

1. A wireless transmission device comprising:
a first interference suppression processing unit which generates an interference suppression transmission signal for partially suppressing leakage power of a signal to an interference avoidance band by frequency-domain processing for the signal in a partial frequency band of transmission signals; and
a second interference suppression processing unit which generates an interference suppression transmission signal for suppressing leakage power of a signal to the interference avoidance band by time-domain processing for the signal in a partial or entire frequency band of transmission signals,
wherein the second interference suppression processing unit performs time-domain processing on a signal among the transmission signals in a frequency band in which the first interference suppression processing unit does not perform frequency-domain processing.

2. The wireless transmission device according to claim 1, wherein the first interference suppression processing unit performs frequency-domain processing on a signal in a frequency band close to the interference avoidance band among the transmission signals.

3. The wireless transmission device according to claim 1, further comprising
an interference suppression processing allocation unit which decides on a range of frequency band, on which interference suppression is performed by frequency-domain processing, and a range of frequency band, on which interference suppression is performed by time-domain processing, across the frequency band of transmission signals based on interference suppression requesting information indicative of levels of interference suppression required.

4. The wireless transmission device according to claim 1, wherein a partial band of the interference avoidance band to be targeted by the first interference suppression processing unit to suppress leakage power is near a transmission band.

5. The wireless transmission device according to claim 1, wherein
the first interference suppression processing unit includes a leakage power suppression signal generating unit which generates a leakage power suppression signal as a signal for partially suppressing leakage power in the interference avoidance band, and
the second interference suppression processing unit includes a symbol waveform shaping unit which shapes a symbol waveform in a time domain.

6. The wireless transmission device according to claim 5, further comprising
an operation parameter changing unit which changes an operation parameter for the first interference suppression processing unit or the second interference suppression processing unit based on interference suppression requesting information indicative of levels of interference suppression required or predetermined control information as an interference suppression processing parameter,
wherein the operation parameter changing unit changes the number of leakage power suppression signals according to the interference suppression requesting information or the predetermined control information, and notifies a destination device of the number of leakage power suppression signals after being changed.

7. The wireless transmission device according to claim 5, further comprising
an operation parameter changing unit which changes an operation parameter for the first interference suppression processing unit or the second interference suppression processing unit based on interference suppression requesting information indicative of levels of interference suppression required or predetermined control information as an interference suppression processing parameter,
wherein the operation parameter changing unit changes a bandwidth of a partial band of the interference avoidance band to be targeted by the first interference suppression processing unit to suppress leakage power according to the interference suppression requesting information or the predetermined control information.

8. The wireless transmission device according to claim 5, wherein the leakage power suppression signal generating unit includes:
an interference suppression symbol generating unit which inputs information on the interference avoidance band and information on a transmission symbol obtained by frequency mapping a transmission signal targeted for interference suppression by frequency-domain processing, and generating a transmission signal with an interference suppression symbol inserted therein as the transmission symbol, wherein the interference suppression symbol is a symbol for suppressing leakage power to a partial band of the interference avoidance band;

an inverse Fourier transform unit which inputs the transmission signal supplied from the interference suppression symbol generating unit, and performing inverse Fourier transform processing on the transmission signal to generate a subcarrier signal;

a parallel/serial conversion unit which inputs the subcarrier signal supplied from the inverse Fourier transform unit, converting the subcarrier signal to a serial signal, and outputting the serial signal; and a guard interval adding unit which inputs the signal supplied from the parallel/serial conversion unit, and adding a guard interval to each transmission frame on which inverse Fourier transform was performed.

9. The wireless transmission device according to claim 1, wherein the range of frequency band, on which interference suppression is performed by frequency-domain processing, and the range of frequency band, on which interference suppression is performed by time-domain processing, are decided in a unit of radio resource.

10. The wireless transmission device according to claim 9, wherein the range of frequency band, on which interference suppression is performed by frequency-domain processing, and the range of frequency band, on which interference suppression is performed by time-domain processing, are decided in a unit of subcarrier.

11. A wireless transmission method comprising:
generating an interference suppression transmission signal for partially suppressing leakage power of a signal to an interference avoidance band by frequency-domain processing for the signal in a partial frequency band of transmission signals; and
generating an interference suppression transmission signal for suppressing leakage power of a signal to the interference avoidance band by time-domain processing for the signal in a partial or entire frequency band of transmission signals,
wherein the time-domain processing is performed on a signal among the transmission signals in a frequency band in which the frequency-domain processing is not performed.

12. The wireless transmission method according to claim 11, wherein the frequency-domain processing is performed on a signal in a frequency band close to the interference avoidance band among the transmission signals.

13. The wireless transmission method according to claim 11, further comprising
deciding on a range of frequency band, on which interference suppression is performed by frequency-domain processing, and a range of frequency band, on which interference suppression is performed by time-domain processing, across the frequency band of transmission signals based on interference suppression requesting information indicative of levels of interference suppression required.

14. A computer readable information recording medium storing a wireless transmission program which, when executed by a processor, performs a method comprising:
generating an interference suppression transmission signal for partially suppressing leakage power of a signal to an interference avoidance band by frequency-domain processing for the signal in a partial frequency band of transmission signals; and
generating an interference suppression transmission signal for suppressing leakage power of a signal to the interference avoidance band by time-domain processing for the signal in a partial or entire frequency band of transmission signals,
wherein the time-domain processing is performed on a signal among the transmission signals in a frequency band in which the frequency-domain processing is not performed.

15. The computer readable information recording medium according to claim 14, further comprising:
frequency-domain processing on a signal in a frequency band close to the interference avoidance band among the transmission signals.

16. A wireless communication system comprising:
a wireless transmission device for transmitting a radio signal; and an amount-of-interface measurement device including a detection section for detecting the radio signal transmitted by the wireless transmission device, wherein
the amount-of-interference measurement device includes:
an amount-of-interference measurement unit which measures or estimates the amount of interference of the radio signal transmitted by the wireless transmission device with an interference avoidance band; and
a control signal notification unit which generates a control signal based on the amount of interference measured or estimated by the amount-of-interference measurement unit and notifying the wireless transmission device of the control signal, the control signal including interference suppression requesting information indicative of levels of interference suppression required or predetermined control information as an interference suppression processing parameter for frequency-domain processing of part of transmission signals and time-domain processing of part or all of transmission signals performed by the wireless transmission device as interference suppression processing, and wherein
the wireless transmission device includes:
a first interference suppression processing unit which generates an interference suppression transmission signal for partially suppressing leakage power of a signal to an interference avoidance band by frequency-domain processing for the signal in a partial frequency band of transmission signals; and
a second interference suppression processing unit which generates an interference suppression transmission signal for suppressing leakage power of a signal to the interference avoidance band by time-domain processing for the signal in a partial or entire frequency band of transmission signals,
wherein the second interference suppression processing unit performs time-domain processing on a signal among the transmission signals in a frequency band in which the first interference suppression processing unit does not perform frequency-domain processing.

17. The wireless communication system according to claim 16, wherein the predetermined control information as the parameter for frequency-domain processing of the part of transmission signals and time-domain processing of the part or all of transmission signals performed by the wireless transmission device as interference suppression processing is at least any one of the number of radio resources to be subjected to interference suppression by frequency-domain processing among the transmission signals, a bandwidth of a partial frequency band of the interference avoidance band targeted for suppressing leakage power in the frequency-domain processing, a frequency position in the partial frequency band of the interference avoidance band targeted for suppressing leakage power in the frequency-domain processing, the number of leakage power suppression signals to be generated for suppressing leakage power in the frequency-domain processing, and an overlapping length of anterior and posterior symbols targeted for generating a symbol waveform in the time-domain processing.

* * * * *